United States Patent
Hwang et al.

(10) Patent No.: US 9,945,603 B2
(45) Date of Patent: Apr. 17, 2018

(54) REFRIGERATOR AND CONTROL METHOD OF THE SAME

(71) Applicant: SAMSUNG ELECTRONICS CO., LTD., Suwon-si, Gyeonggi-do (KR)

(72) Inventors: Kyung Ho Hwang, Anyang-si (KR); Jea Won Lee, Hwaseong-si (KR); Byung Mo Yu, Suwon-si (KR); Jong Ho Lee, Yongin-si (KR); Hyeon Kyu Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 15/057,419

(22) Filed: Mar. 1, 2016

(65) Prior Publication Data

US 2016/0258674 A1    Sep. 8, 2016

(30) Foreign Application Priority Data

Mar. 5, 2015    (KR) .................... 10-2015-0030677

(51) Int. Cl.
*B01F 3/04* (2006.01)
*A23L 2/00* (2006.01)
(Continued)

(52) U.S. Cl.
CPC ............ *F25D 29/00* (2013.01); *A23L 2/00* (2013.01); *A23L 2/54* (2013.01); *B01F 3/0478* (2013.01);
(Continued)

(58) Field of Classification Search
CPC ...... A23L 2/00; A23L 2/54; B01F 3/04; B01F 3/04099; B01F 3/04787
(Continued)

(56) References Cited

U.S. PATENT DOCUMENTS

| 4,509,569 A | 4/1985 | Adolfsson |
| 7,374,156 B2* | 5/2008 | Ooyachi ............ B01F 3/04808 261/36.1 |

(Continued)

FOREIGN PATENT DOCUMENTS

| CN | 102188162 | 9/2011 |
| CN | 103423936 | 12/2013 |

(Continued)

OTHER PUBLICATIONS

European Search Report dated Jul. 7, 2016 in corresponding European Patent Application No. 16158571.6.

(Continued)

*Primary Examiner* — Robert A Hopkins
(74) *Attorney, Agent, or Firm* — Staas & Halsey LLP

(57) ABSTRACT

Disclosed herein are a refrigerator and a control method of the same. The refrigerator includes a purified water pump which increases a pressure of water, a carbon dioxide regulator which decreases a pressure of carbon dioxide, a mixing pipe which mixes water which introduced from the purified water pump and carbon dioxide which introduced from the carbon dioxide regulator, and produces carbonated water, a user interface which receives a production condition of carbonated water from a user, and a controller which controls the purified water pump and the carbon dioxide regulator such that the pressure of the water and the pressure of the carbon dioxide reach a target pressure corresponding to the input production condition.

18 Claims, 22 Drawing Sheets

(51) Int. Cl.
*F25D 29/00* (2006.01)
*F25D 23/12* (2006.01)
*A23L 2/54* (2006.01)
*B01F 15/00* (2006.01)
*F25D 11/00* (2006.01)

(52) U.S. Cl.
CPC ...... *B01F 3/04099* (2013.01); *B01F 3/04808* (2013.01); *B01F 15/00344* (2013.01); *B01F 15/00357* (2013.01); *F25D 11/00* (2013.01); *F25D 23/126* (2013.01); *A23V 2002/00* (2013.01); *B01F 2003/04893* (2013.01); *F25D 2323/122* (2013.01); *F25D 2331/806* (2013.01); *F25D 2600/06* (2013.01); *F25D 2700/00* (2013.01)

(58) Field of Classification Search
USPC .............. 261/36.1, 78.2, DIG. 7; 99/323.1; 426/477
See application file for complete search history.

(56) References Cited

U.S. PATENT DOCUMENTS

| | | | |
|---|---|---|---|
| 8,348,243 | B2 | 1/2013 | Schori et al. |
| 9,107,448 | B2 * | 8/2015 | Giardino ................ A23L 2/54 |
| 2011/0220209 | A1 | 9/2011 | Schori et al. |
| 2013/0309361 | A1 | 11/2013 | Kyong et al. |
| 2014/0239522 | A1 | 8/2014 | An et al. |
| 2014/0356491 | A1 | 12/2014 | Giardino |

FOREIGN PATENT DOCUMENTS

| | | |
|---|---|---|
| EP | 1 579 905 A2 | 9/2005 |
| EP | 1 579 905 A3 | 3/2006 |
| EP | 1 974 802 A1 | 10/2008 |
| GB | 2 408 467 A | 6/2005 |
| JP | 6-333152 | 12/1994 |
| KR | 1992-0007573 | 5/1992 |
| KR | 10-1054266 | 8/2011 |
| KR | 10-2011-0098419 | 9/2011 |
| WO | 2004/089521 | 10/2004 |

OTHER PUBLICATIONS

Chinese Office Action dated Dec. 8, 2017 in Chinese Patent Application No. 2016101274417.

European Communication dated Dec. 12, 2018 in European Patent Application No. 16158571.6.

* cited by examiner

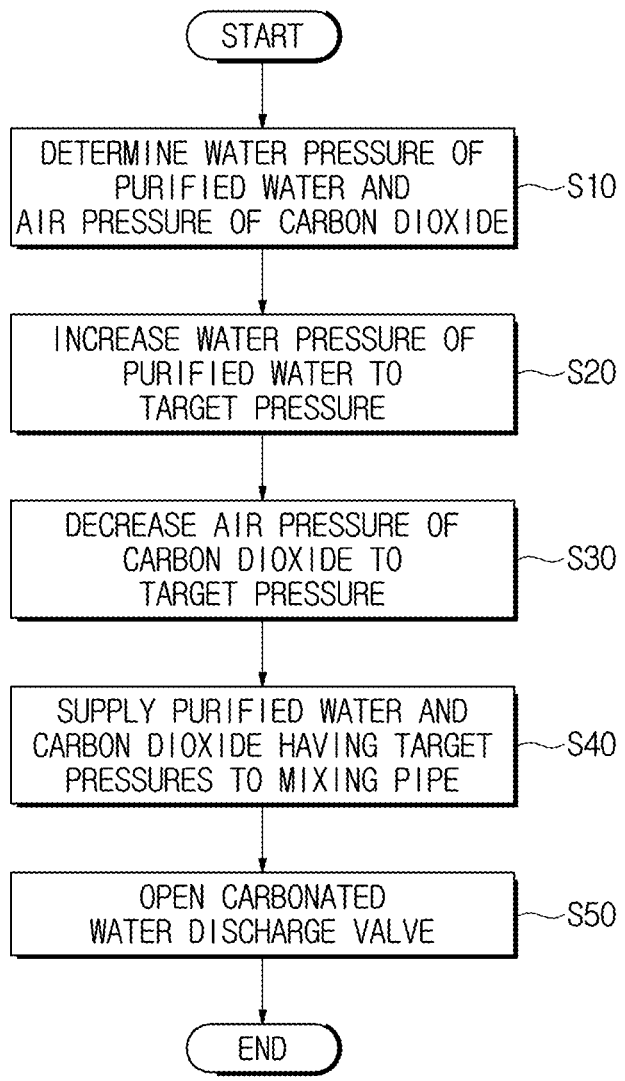

REFRIGERATOR AND CONTROL METHOD OF THE SAME

CROSS-REFERENCE TO RELATED APPLICATION

This application claims the benefit of Korean Patent Application No. 2015-0030677, filed on Mar. 5, 2015 in the Korean Intellectual Property Office, the disclosure of which is incorporated herein by reference.

BACKGROUND

1. Field

The present disclosure is related to a refrigerator and a control method of the same.

2. Description of the Related Art

In general, a refrigerator refers to an appliance which includes storage chambers for storing food and a cooling air supply unit for supplying cooling air to the storage chambers to maintain the freshness of the stored food. To meet the requirement of users, the refrigerator may include an ice-making device for making ice and a dispenser from which a user extracts purified water or the ice from the outside of the refrigerator without opening doors.

Although there have been demands for refrigerators which supply not only purified water or ice but also processed beverages, the conventional refrigerators merely supply purified water or ice to users, and cannot supply processed beverages.

In addition, in a carbonated water production, when tap water supplied through a tap is purified, and carbonated water is produced with the purified water, there is a problem in that a pressure of the water is low, and thus solubility of carbon dioxide is low. Accordingly, a study related to this has been actively performed recently.

SUMMARY

Therefore, it is one aspect of the present disclosure to provide a refrigerator that is capable of increasing a pressure of water which is mixed with carbon dioxide to increase solubility of the carbon dioxide, and decreasing production time, and a method of controlling the same.

Additional aspects of the disclosure will be set forth in part in the description which follows and, in part, will be obvious from the description, or may be learned by practice of the disclosure.

In accordance with one aspect of the present disclosure, a refrigerator includes a purified water pump which increases a pressure of water, a carbon dioxide regulator which decreases a pressure of carbon dioxide, a mixing pipe which mixes water which introduced from the purified water pump and carbon dioxide which introduced from the carbon dioxide regulator, and produces carbonated water, a user interface which receives a production condition of carbonated water from a user, and a controller which controls the purified water pump and the carbon dioxide regulator such that the pressure of the water and the pressure of the carbon dioxide reach a target pressure corresponding to the input production condition.

The user interface may receive a target concentration of carbonated water from a user, and the controller may control to adjust a supply amount and pressure of the water and the carbon dioxide supplied to the mixing pipe such that a concentration of carbonated water produced in the mixing pipe reaches the input target concentration.

The carbon dioxide regulator may include a carbon dioxide supply motor and a rotation sensor which senses a rotation displacement of the carbon dioxide supply motor using at least one of an optical sensor and a hall sensor.

The mixing pipe may include a purified water inlet pipe through which the water flows in, a carbon dioxide inlet pipe through which the carbon dioxide flows in, a first mixing pipe which is connected to the purified water inlet pipe and the carbon dioxide inlet pipe, mixes the water and the carbon dioxide, and produces carbonated water, and a second mixing pipe which is connected to the first mixing pipe, and discharges the produced carbonated water.

An inner diameter of the first mixing pipe may be greater than that of the second mixing pipe.

The mixing pipe may further include an impeller which is positioned in the first mixing pipe and rotates to mix the water and the carbon dioxide.

The mixing pipe may further include a mixing partition which provides a flow path configured to prevent flow of the water and the carbon dioxide in the first mixing pipe, and generates a vortex.

The refrigerator may further include a carbonated water tank which is provided at a discharge hole of the mixing pipe, stores produced carbonated water, and matures the carbonated water to adjust a size of bubble thereof.

The carbonated water tank may include a water level sensor which senses a water level of carbonated water, and when the sensed water level of the carbonated water is equal to or less than a preset water level, the controller may control the purified water pump and the carbon dioxide regulator to produce carbonated water until the water level of the carbonated water is greater than the preset water level.

In accordance with another aspect of the present disclosure, a refrigerator includes a purified water pump which increases a pressure of water, a carbon dioxide regulator which decreases a pressure of carbon dioxide, a mixing pipe which mixes water which introduced from the purified water pump, and carbon dioxide which introduced from the carbon dioxide regulator, and produces carbonated water, and a controller which determines a target pressure of the water and the carbon dioxide, and controls the purified water pump and the carbon dioxide regulator such that the pressure of the water and the pressure of the carbon dioxide reaches the target pressure.

In accordance with still another aspect of the present disclosure, a method of controlling a refrigerator, includes receiving a production condition of carbonated water from a user, increasing a pressure of water to a target pressure corresponding to the input production condition using a purified water pump, decreasing a pressure of carbon dioxide to a target pressure using a carbon dioxide regulator, and mixing produced water and carbon dioxide having the target pressure using a mixing pipe, and producing carbonated water.

In accordance with yet another aspect of the present disclosure, a method of controlling a refrigerator, includes determining a target pressure of water and carbon dioxide, increasing a pressure of the water to the target pressure using a purified water pump, decreasing a pressure of the carbon dioxide to the target pressure using a carbon dioxide regulator, and mixing the produced water and the carbon dioxide having the target pressure using a mixing pipe, and producing carbonated water.

BRIEF DESCRIPTION OF THE DRAWINGS

These and/or other aspects of the disclosure will reach apparent and more readily appreciated from the following description of the embodiments, taken in conjunction with the accompanying drawings of which:

FIG. 15 illustrates a flowchart of a method of producing carbonated water according to one embodiment of the present disclosure.

DETAILED DESCRIPTION

Figure 1:
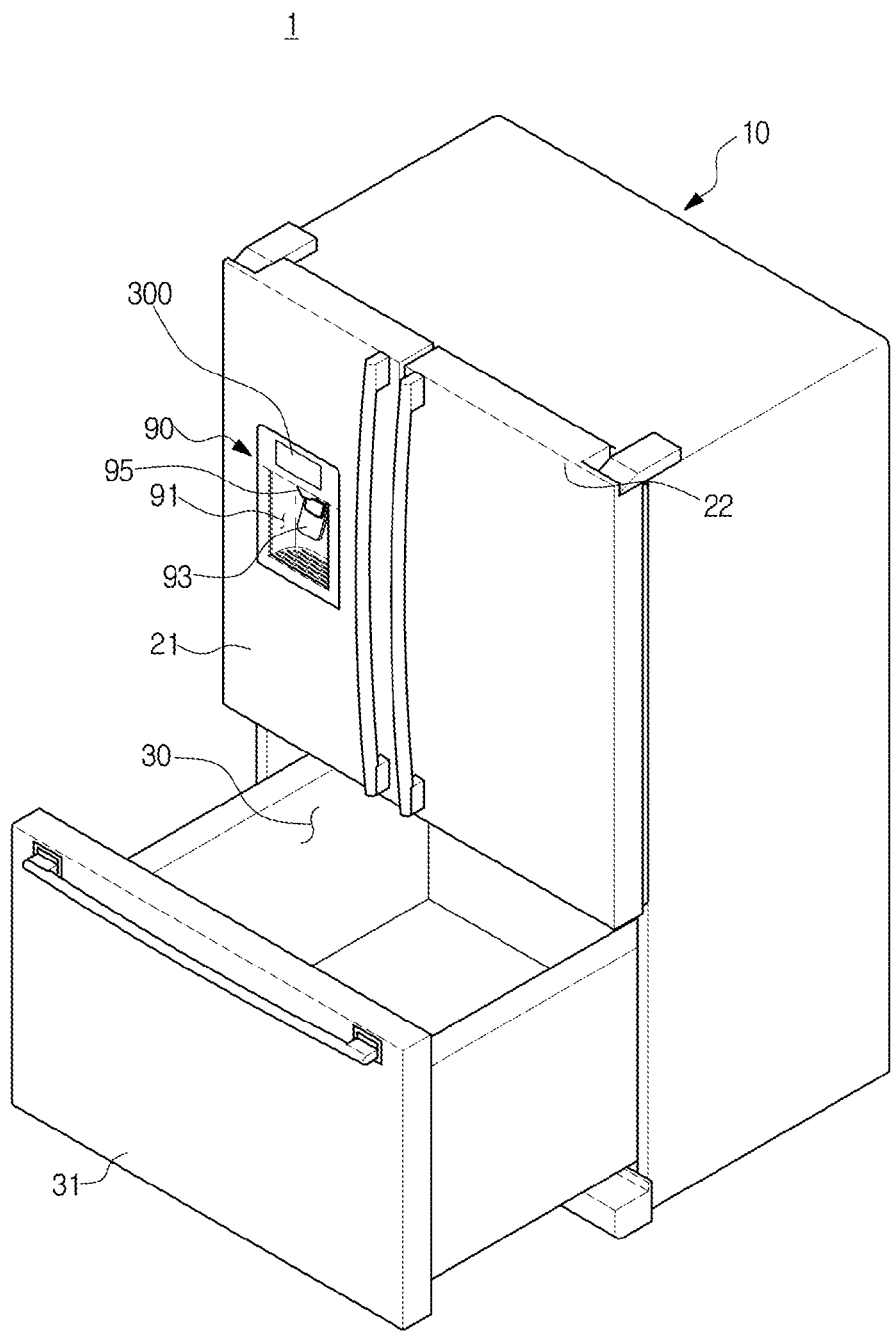
FIG. 1 illustrates an exterior of a refrigerator according to one embodiment of the present disclosure.

Hereinafter, in order to facilitate understanding and reproduction by those skilled in the art, the present disclosure will be described in detail by explaining exemplary embodiments with reference to the accompanying drawings. In detailed descriptions of the disclosure, when it is determined that detailed descriptions of related well-known functions and configurations unnecessarily obscure the gist of the disclosure, detailed descriptions thereof will be omitted.

Terms described below are selected by considering functions in the embodiment and meanings may vary depending on, for example, a user or operator's intentions or customs. Therefore, in the following embodiments, when terms are specifically defined, the meanings of terms should be interpreted based on those definitions, and otherwise, should be interpreted based on general meanings recognized by those skilled in the art.

Although the configurations of selectively described aspects or selectively described embodiments below are illustrated as a single integrated configuration in the drawings, unless otherwise described, it should be understood that these may be freely combined with each other as long as there is no clear technological contradiction in such combinations for those skilled in the art.

Hereinafter, one embodiment of a refrigerator and a control method of the refrigerator will be described with reference to accompanying drawings.

Hereinafter, one embodiment of a refrigerator will be described with reference to FIGS. 1 and 2.

Figure 2:
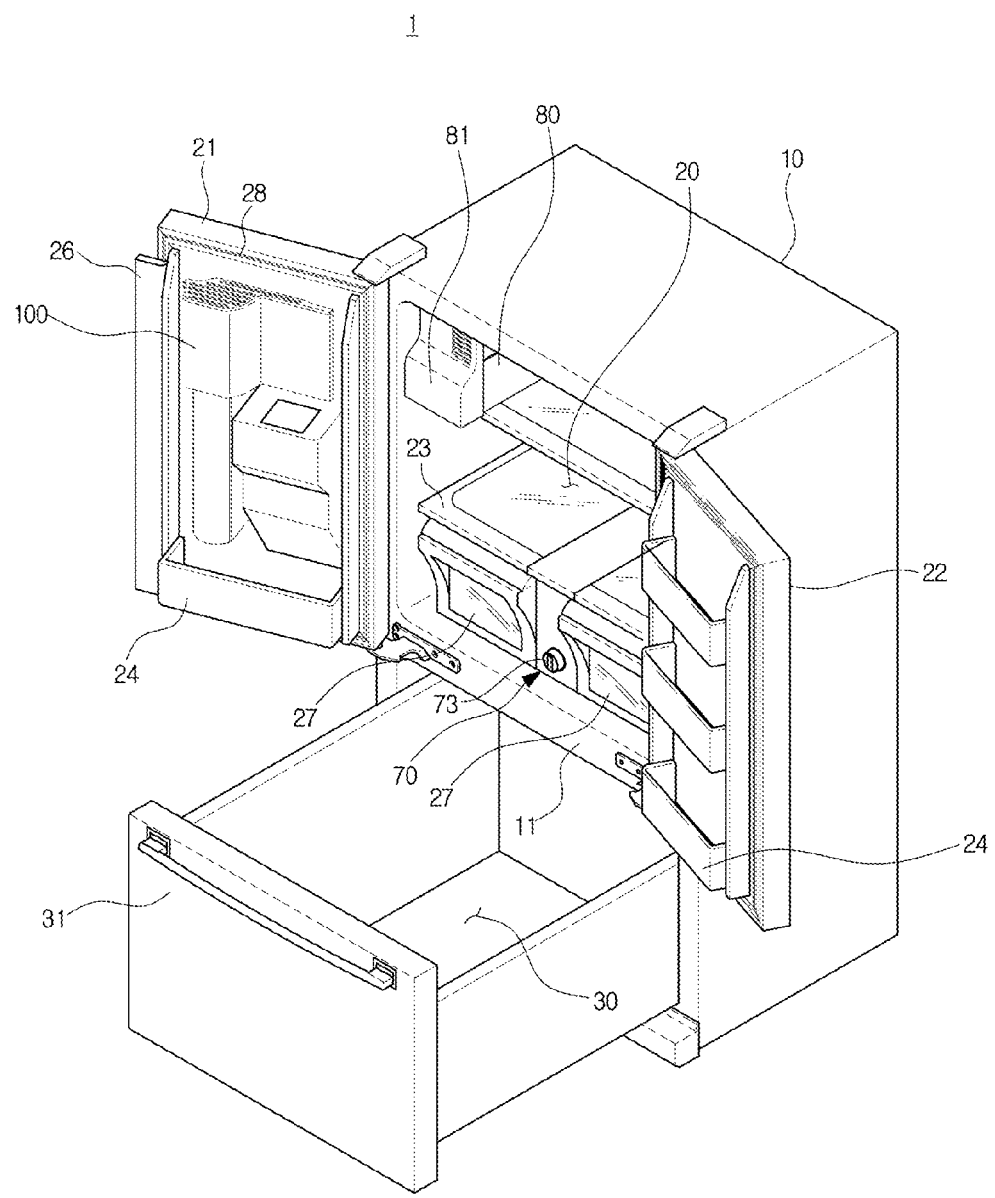
FIG. 2 illustrates an inner portion of the refrigerator according to one embodiment of the present disclosure.

FIG. 1 illustrates an exterior of a refrigerator, and FIG. 2 illustrates an inner portion of the refrigerator.

Referring to FIGS. 1 and 2, a refrigerator 1 may include a main body 10, storage compartments 20, 30 provided in the main body 10, and a cooling air supply unit which supplies cooling air to the storage compartments 20, 30.

The main body 10 may include an inner box forming the storage compartments 20, 30, an outer box which is coupled to an outer side of the inner box and forms an exterior of the refrigerator 1, and an insulation member which is disposed between the inner box and the outer box and insulates the storage compartments 20, 30 from the outside.

The storage compartments 20, 30 may be divided into a refrigerator compartment 20 at an upper portion and a freezer compartment 30 at a lower portion by an intermediate partition 11. The refrigerator compartment 20 may be maintained at about 3° above zero to store food under refrigeration, and the freezer compartment 30 may be maintained at about 18.5° below zero.

Although the refrigerator compartment 20 and the freezer compartment 30 which are vertically divided are described in the above, it is not limited thereto, and the refrigerator compartment 20 and the freezer compartment 30 may be laterally divided by the intermediate partition 11.

Shelves 23 on which food may be put and at least one storage box 27 which stores food in a sealed state may be provided in the refrigerator compartment 20.

In addition, the refrigerator compartment 20 may be provided with a purified water supply module 70 which purifies and stores water, and the purified water supply module 70 may include a water-purifying filter 73 which purifies water supplied by a water source, a purified water tank 71 which stores the purified water, etc.

In addition, although the purified water supply module 70 may be provided between a plurality of storage boxes 27 as illustrated in FIG. 2, it is not limited thereto. It is sufficient for the purified water supply module 70 to be provided in the refrigerator compartment 20 such that purified water in the purified water supply module 70 is cooled by cooling air in the refrigerator compartment 20.

A specific structure of the purified water supply module 70 will be described in detail below with reference to FIG. 10.

In addition, an ice-making room 80 which is capable of making ice may be formed at an upper corner of the refrigerator compartment 20 to be separated from the refrigerator compartment 20. An ice-making unit 81 which makes and stores ice may be provided in the ice-making room 80.

The ice-making unit 81 may include an ice-making tray which makes ice using purified water supplied from the purified water tank 70, an ice bucket which stores the ice made by the ice-making tray, etc.

Each of the refrigerator compartment 20 and the freezer compartment 30 has an open front through which food is put in or taken out. The open front of the refrigerator compartment 20 may be opened/closed by a pair of rotating doors 21, 22 coupled to the main body 10 by a hinge, and the open front of the freezer compartment 30 may be opened/closed by a sliding door 31 which is movable by sliding with respect to the main body 10.

A door guard 24 capable of storing food may be provided on rear surfaces of the refrigerator compartment doors 21, 22. Gaskets 28 which seal between the refrigerator compartment doors 21, 22 and the main body 10 to keep cooling air of the refrigerator compartment 20 when the refrigerator compartment doors 21, 22 are closed may be provided at edges of the rear surfaces of the refrigerator compartment doors 21, 22.

In addition, a rotational bar 26 which seals between the refrigerator compartment door 21 and the refrigerator compartment door 22 to keep the cooling air of the refrigerator compartment 20 when the refrigerator compartment doors 21, 22 are closed may optionally be provided at any one refrigerator compartment door 21 of the refrigerator compartment doors 21, 22.

In addition, a dispenser module 90 capable of extracting purified water, carbonated water, or ice from the outside without opening the refrigerator compartment door 21 and a user interface 200 which receives a control command related to an operation of the refrigerator 1 from a user and displays the operation information of the refrigerator 1 may be provided in any one refrigerator compartment door 21 of the refrigerator compartment doors 21, 22.

The dispenser module 90 may include a water-dispensing space 91 in which a container such as a cup and a bottle is inserted and water or ice can be obtained, a dispenser lever 93 capable of operating the dispenser module 90 to dispense purified water, carbonated water, or ice, and a dispenser nozzle 95 which dispenses purified water or carbonated water.

A specific structure and an operation of the dispenser module 90 will be described in detail below with reference to FIGS. 5A and 5B.

The user interface 200 may include a touch switch which receives various control commands for the refrigerator 1 from a user and a display which displays operation information of the refrigerator 1 to the user.

The user interface 200 may receive a target temperature of the refrigerator compartment 20, a target temperature of the freezer compartment 30, a carbonated water production command, a carbonated water target concentration, and the like and may display the current temperature of the refrigerator compartment 20, the current temperature of the freezer compartment 30, whether carbonated water is produced, the concentration of the produced carbonated water, and the like in response to the control commands of a user.

A specific structure and an operation of the user interface 200 will be described in detail below with reference to FIG. 4.

A carbonated water production module 100 which produces and stores carbonated water may be installed in a rear surface of the refrigerator compartment door 21 in which the dispenser module 90 of the refrigerator 1 is provided.

A specific description of the carbonated water production module 100 will be described with reference to FIG. 10.

Figure 3:
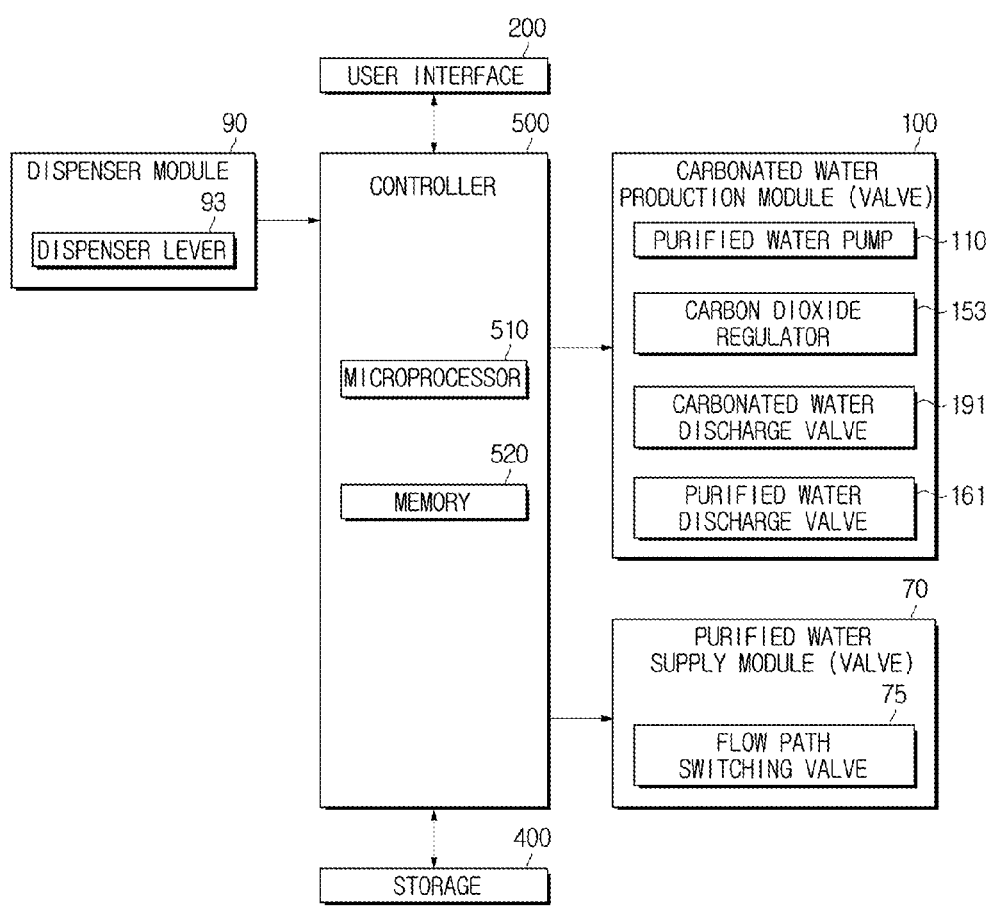
FIG. 3 is a view illustrating a block diagram of the refrigerator according to one embodiment of the present disclosure.
Figure 4:
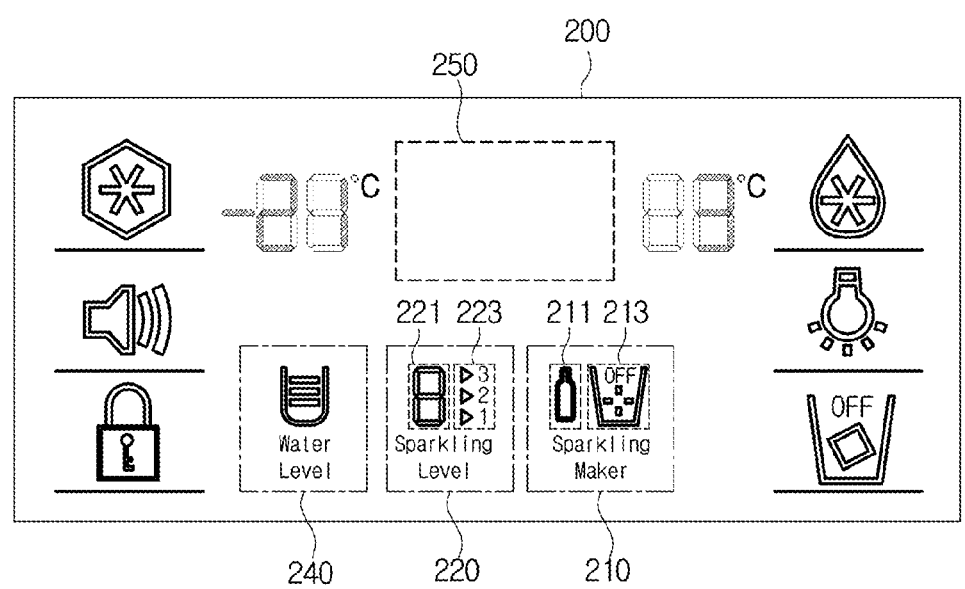
FIG. 4 illustrates a user interface included in the refrigerator according to one embodiment of the present disclosure refrigerator.

FIG. 3 is a view illustrating a block diagram of the refrigerator, and FIG. 4 illustrates a user interface included in the refrigerator.

As illustrated in FIG. 3, the refrigerator 1 may include the dispenser module 90, the purified water supply module 70, the carbonated water production module 100, the user interface 200 which interacts with a user, a storage 400 which stores programs and data related to an operation of the refrigerator 1, and a controller 500 which controls all operations of the refrigerator 1.

The dispenser module 90 may receive a water-purifying operation, an ice-making operation, and a carbonated water producing operation according to positions of the dispenser lever 93 to transmit input signals for the corresponding operations to the controller 500. Specific description of the dispenser module 90 will be described with reference to FIGS. 5A and 5B below.

The purified water supply module 70 may receive water from a tap water pipe 40 outside the refrigerator 1, purify the water, store the purified water, and adjust a water temperature. In addition, the purified water supply module 70 may include a flow path switching valve 75.

The carbonated water production module 100 may receive purified water from the purified water supply module 70, mix the purified water and carbon dioxide stored in a carbon dioxide cylinder 120, and produce carbonated water. In addition, the carbonated water production module 100 may include a purified water pump 110, a carbon dioxide regulator 153, a carbonated water discharge valve 191, and a purified water discharge valve 161.

Specific description of the purified water supply module 70 and the carbonated water production module 100 will be described with reference to FIG. 10 below.

The user interface 200 may display a temperature and a humidity in the refrigerator 1, a carbonated water target concentration, a produced carbonated water concentration, and a stored amount to a user, and receive a target temperature in the refrigerator, a carbonated water target concentration, and the like from the user.

Specifically, as illustrated in FIG. 4, the user interface 200 may include a carbonated water production display region 210 which receives a carbonated water production command from a user and displays carbonated water production information, a carbonated water concentration setting region 220 which receives a carbonated water concentration setting command and displays carbonated water concentration setting information, a carbonated water level display region 240 which displays an amount of purified water or a water level of purified water, and a message display region 250 which displays various messages.

All the regions 210, 220, 240, and 250 included in the user interface 200 may include a touch switch which senses touch or pressurization of a user, and a display which displays images to the user.

A push switch or a membrane switch which senses a pressurization of a user, or a touch pad which senses a touch of the user may be adopted as the touch switch. In addition, a liquid crystal display (LCD) panel, a light emitting diode (LED) panel, or a organic light emitting diode (OLED) may be adopted as the display.

All regions 210, 220, 240, and 250 included in the user interface 200 may adopt a touch screen in which the touch switch and the display are integrated, and which receives a control command according to a touch of a user and displays operation information corresponding to the control command.

The carbonated water production display region 210 may receive a carbonated water production command from a user.

Specifically, the carbonated water production display region 210 may include a low pressure display region 211 which warns that a pressure of carbon dioxide discharged from the carbon dioxide cylinder 120 is less than a reference pressure, and a carbonated water production display region 213 which receives a carbonated water production command, and displays that carbonated water is being produced.

For example, when a pressure of carbon dioxide discharged from the carbon dioxide cylinder 120 is less than a reference pressure, the refrigerator 1 may display a low pressure display image in the low pressure display region 211 to warn the low pressure of carbon dioxide. In addition, when refrigerator 1 is producing carbonated water, the refrigerator 1 may display a carbonated water production image in the carbonated water production display region 213 to display the carbonated water production to a user.

In addition, when a user touches or presses the carbonated water production display region 210, the refrigerator 1 may start a carbonated water production, and display a carbonated water production display image in the carbonated water production display region 213.

The carbonated water concentration setting region 220 may receive a carbonated water concentration setting command from a user.

The carbonated water concentration setting region 220 may include a current concentration display region 221 which displays a concentration of carbonated water accommodated in the mixing pipe 130 or a carbonated water tank 138 during a carbonated water production, and a target concentration display region 223 which displays a target concentration of carbonated water set by a user.

For example, as illustrated in FIG. 4, a concentration of carbonated water accommodated in the mixing pipe 130 or the carbonated water tank 138 during a carbonated water production may be displayed in the current concentration display region 221 in a form of a seven segment, and an image corresponding to a target concentration input by a user may be displayed in the target concentration display region 223.

In addition, when a user touches or presses the carbonated water concentration setting region 220, the refrigerator 1 changes a target carbonated water concentration, and changes a target concentration displayed in the target concentration display region 223.

A carbonated water level display region 240 may display an amount of supplied purified water or a water level of purified water.

For example, the refrigerator 1 may classify water levels of supplied purified water into three levels between a lowest water level and a highest water level, and the carbonated water level display region 240 may display different numbers of indicators according to a water level of carbonated water.

Specifically, when a water level of purified water supplied to the carbonated water tank 138 corresponds to one third of the highest water level, one indicator may be displayed, when the water level of purified water corresponds to two thirds of the highest water level, two indicators may be displayed, and when the water level of purified water corresponds to the highest water level, three indicators may be displayed.

The message display region 250 may display various messages such that the refrigerator 1 interacts with a user.

For example, when a carbonated water production is started, a carbonated water production start message may be displayed, and when the carbonated water production is completed, a carbonated water production completion message may be displayed.

The storage 400 stores programs and data related to a cooling operation and programs and data related to a carbonated water production of the refrigerator 1.

For example, the storage 400 may store a target temperature of the freezer compartment 30, a target temperature of the refrigerator compartment 20, and the like related to a cooling operation, and may store a water level of carbonated water, a current carbonated water concentration, a carbonated water target concentration, and the like related to a carbonated water production.

Such a storage 400 may include non-volatile memories such as a magnetic disc drive and a solid state drive which store programs and data for controlling operations of the refrigerator 1.

The controller 500 controls all operations of the refrigerator 1.

Specifically, the controller 500 may control the carbonated water production module 100 to produce carbonated water according to a carbonated water production command and a target concentration of a user.

Such a controller 500 may include a memory 520 which memorizes control programs and control data read from the storage 400, and a microprocessor 510 which performs a calculation operation according to the control programs and the control data memorized in the memory 520.

The memory 520 may include volatile memories such as a static random access memory (SRAM), a dynamic random access memory (DRAM), etc. However, it is not limited thereto, and in some case, the memory 520 may also include non-volatile memories such as a flash memory, and an erasable programmable read only memory (EPROM).

The microprocessor 510 performs calculation operations for controlling various configurations included in the refrigerator 1 according to control programs and control data stored in the memory 520.

Specifically, the microprocessor 510 processes control commands input through the user interface 200, and performs calculation operations for controlling a purified water supply valve 111, a carbon dioxide supply valve 151, a carbon dioxide discharge valve 157, and the flow path switching valve 75.

Hereinafter, operations of the refrigerator 1 which will be described below may be regarded as operations by control operations of the controller 500.

Figure 5A:
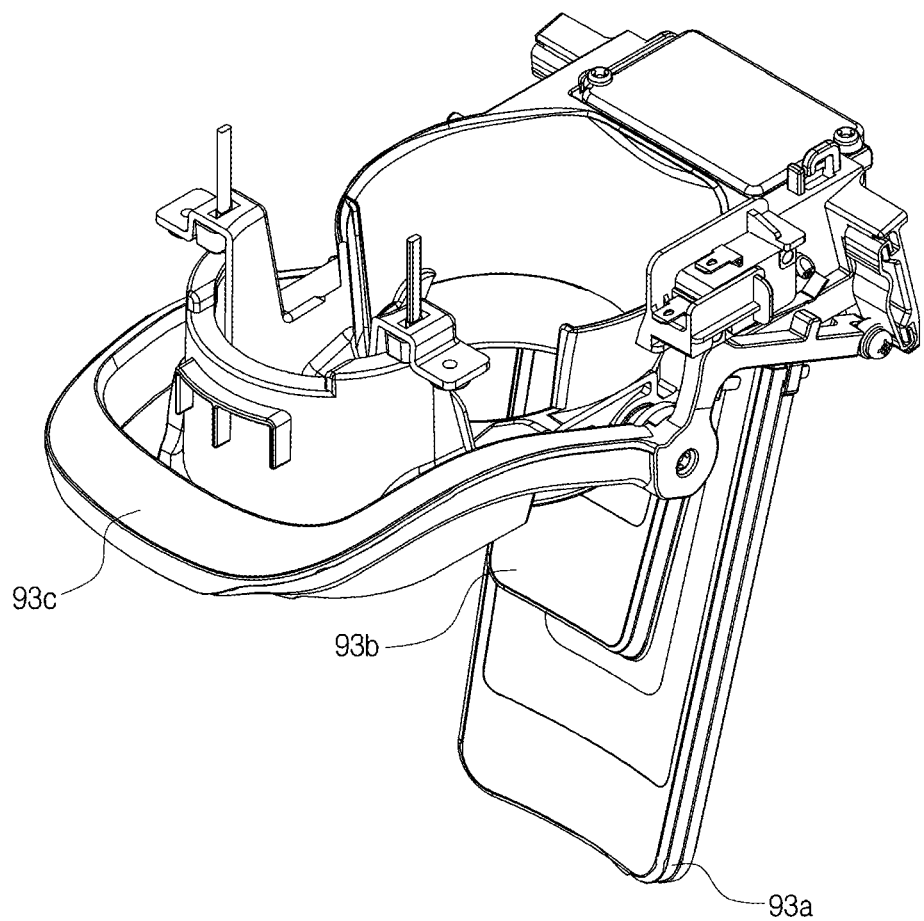
FIG. 5A illustrates a structure of a dispenser module included in the refrigerator according to one embodiment of the present disclosure refrigerator.
Figure 5B:
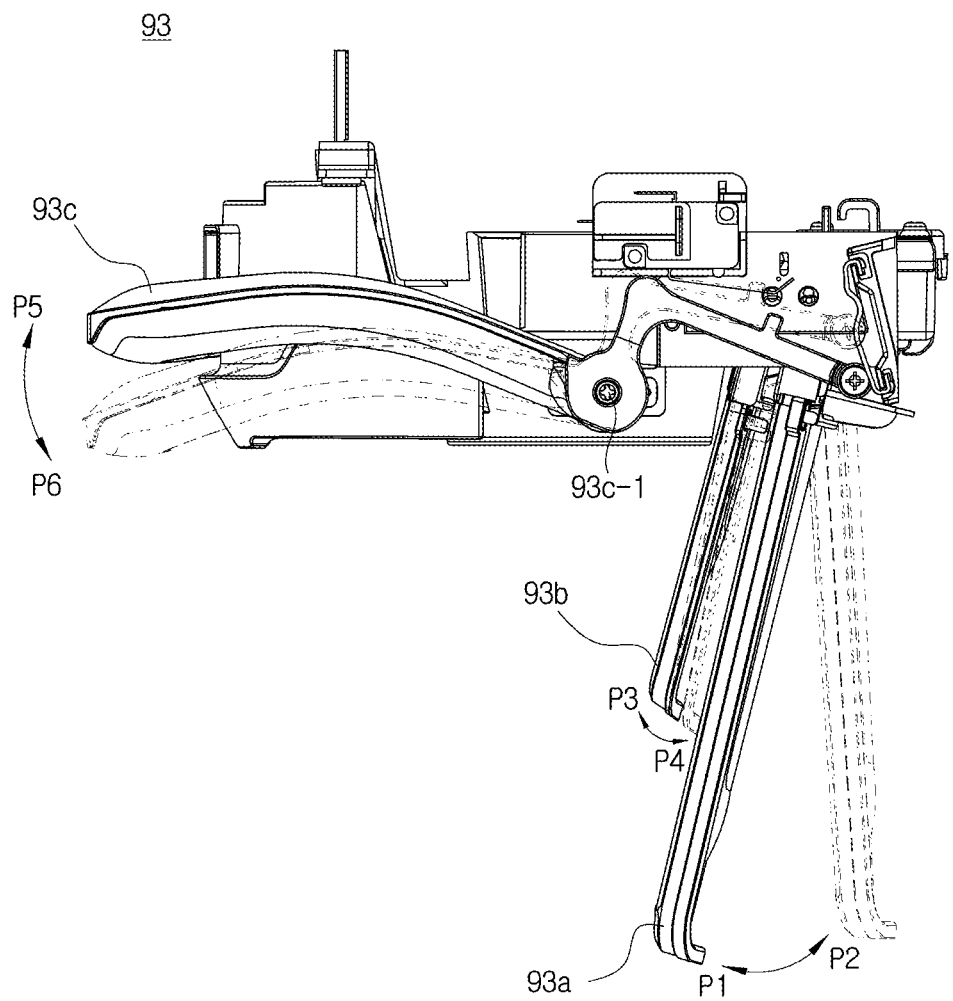
FIG. 5B illustrates an operation of the dispenser module included in the refrigerator according to one embodiment of the present disclosure refrigerator.

FIG. 5A illustrates a structure of a dispenser module included in the refrigerator, and FIG. 5B illustrates an operation of the dispenser module included in the refrigerator.

Referring to FIGS. 5A and 5B, the dispenser lever 93 may include a first dispenser lever 93a, a second dispenser lever 93b, and a third dispenser lever 93c.

The first dispenser lever 93a may be formed extending from an upper side to a lower side, and the first dispenser lever 93a may rotate about a first rotation shaft provided at an upper side of the first dispenser lever 93a in a frontward and backward direction.

Specifically, the first dispenser lever 93a may move between a first position P1 and a second position P2 by rotating about the first rotation shaft. For example, when a user presses the first dispenser lever 93a in a backward direction, the first dispenser lever 93a moves from the first position P1 to the second position P2, and when the user releases the pressure from the first dispenser lever 93a, the first dispenser lever 93a automatically returns to the first position P1.

The second dispenser lever 93b may be provided by being overlapped on the front of the first dispenser lever 93a, and may move by rotating about a second rotation shaft provided at an upper side of the second dispenser lever 93b in a forward and backward direction.

The second dispenser lever 93b may move between a third position P3 and a fourth position P4 by rotating about the second rotation shaft. For example, when a user presses the second dispenser lever 93b in a backward direction, the second dispenser lever 93b moves from the third position P3 to the fourth position P4, and when the user release the pressure from the second dispenser lever 93b, the second dispenser lever 93b automatically returns to the third position P3.

In addition, the third dispenser lever 93c may be provided protruding in a forward direction of the dispenser module 90, and the third dispenser lever 93c may move by vertically rotating about a third rotation shaft 93c-1 positioned at the rear of the third dispenser lever 93c.

Specifically, the third dispenser lever 93c may move between a fifth position P5 and a sixth position P6 by rotating about the third rotation shaft 93c-1. For example, when a user presses the third dispenser lever 93c in a downward direction, the third dispenser lever 93c moves from the fifth position P5 to the sixth position P6 to be fixed at the sixth position P6. In addition, when a user presses the third dispenser lever 93c in a upward direction, the third dispenser lever 93c moves from the sixth position P6 to the fifth position P5 to be fixed at the fifth position P5.

By operating the first dispenser lever 93a, the second dispenser lever 93b, and the third dispenser lever 93c according to a predetermined operation method, a user may input an ice discharge command, a purified water discharge command, or a carbonated water discharge command.

For example, when a user presses the first dispenser lever 93a, the refrigerator 1 may discharge purified water. That is, when the first dispenser lever 93a is positioned at the second position P2, the refrigerator 1 may discharge purified water through the dispenser module 90, and when the first dispenser lever 93a is positioned at the first position P1, the refrigerator 1 may stop discharging the purified water.

For another example, when a user positions the third dispenser lever 93c at the fifth position P5 and presses the second dispenser lever 93b, the refrigerator 1 may discharge carbonated water, and when the user positions the third dispenser lever 93c at the sixth position P6, and presses the second dispenser lever 93b, the refrigerator 1 may discharge ice. In other words, when the second dispenser lever 93b is positioned at the fourth position P4, the refrigerator 1 may discharge carbonated water or ice according to a position of the third dispenser lever 93c, and when the second dispenser lever 93b is positioned at the third position P3, the refrigerator 1 may stop discharging the carbonated water or the ice.

Although the structure of the refrigerator 1 according to one embodiment has been described in the above, the above-described refrigerator 1 is merely one example to which the disclosed disclosure can be applied, and the present disclosure may also be applied to a refrigerator having any structure as long as the refrigerator can produce carbonated water.

FIGS. 6A, 6B, 7A, 7B illustrate one example of a carbon dioxide supply valve included in the refrigerator.

The carbon dioxide supply valve 151 may include a carbon dioxide discharge member 149_1, a carbon dioxide supply motor 141, a worm gear 143, a worm wheel 145, and an eccentric rotation member 147.

The carbon dioxide discharge member 149_1 may be installed at a carbon dioxide exit of the carbon dioxide cylinder 120, and the carbon dioxide discharge member 149_1 may include a carbon dioxide discharge pipe 149b_1 through which carbon dioxide is discharged, and a carbon dioxide discharge button 149a_1 for controlling discharge of carbon dioxide of the carbon dioxide cylinder.

When the carbon dioxide discharge button 149a_1 is pressed, carbon dioxide stored in the carbon dioxide cylinder 120 is discharged to the carbon dioxide discharge pipe 149b_1. In addition, when the carbon dioxide discharge button 149a_1 is not pressurized, the carbon dioxide stored in the carbon dioxide cylinder 120 is not discharged.

The carbon dioxide supply motor 141 generates a turning force for pressing the carbon dioxide discharge button 149a_1 of the carbon dioxide discharge member 149_1.

The worm gear 143 receives a turning force from the carbon dioxide supply motor 141 to rotate about a worm gear rotation shaft 143a. Teeth having a spiral form is formed on an outer circumferential surface of the worm gear 143 for supplying a turning force to the worm wheel 145.

The worm wheel 145 receives a turning force from the worm gear 143 to rotate about a worm wheel rotation shaft 145a. Teeth having a spiral form is formed on an outer circumferential surface of the worm wheel 145 for receiving a turning force from the worm gear 143.

The eccentric rotation member 147 rotates about the worm wheel rotation shaft 145a with the worm wheel 145.

The eccentric rotation member 147 may have a circular shape or an oval shape whose rotation shaft is out of a center thereof. Since the rotation shaft is out of the center as above-described, a distance between an outer surface of the carbon dioxide discharge button 149a_1 in contact with the outer circumferential surface of the eccentric rotation member 147 and the rotation shaft changes while the eccentric rotation member 147 is rotating.

By using the change of the distance between the outer surface of the carbon dioxide discharge button 149a_1 in contact with the outer circumferential surface of the eccentric rotation member 147 and the rotation shaft while the eccentric rotation member 147 is rotating, the eccentric rotation member 147 may press the carbon dioxide discharge button 149a_1 of the carbon dioxide discharge member 149_1, or release the pressure.

Figure 6A:
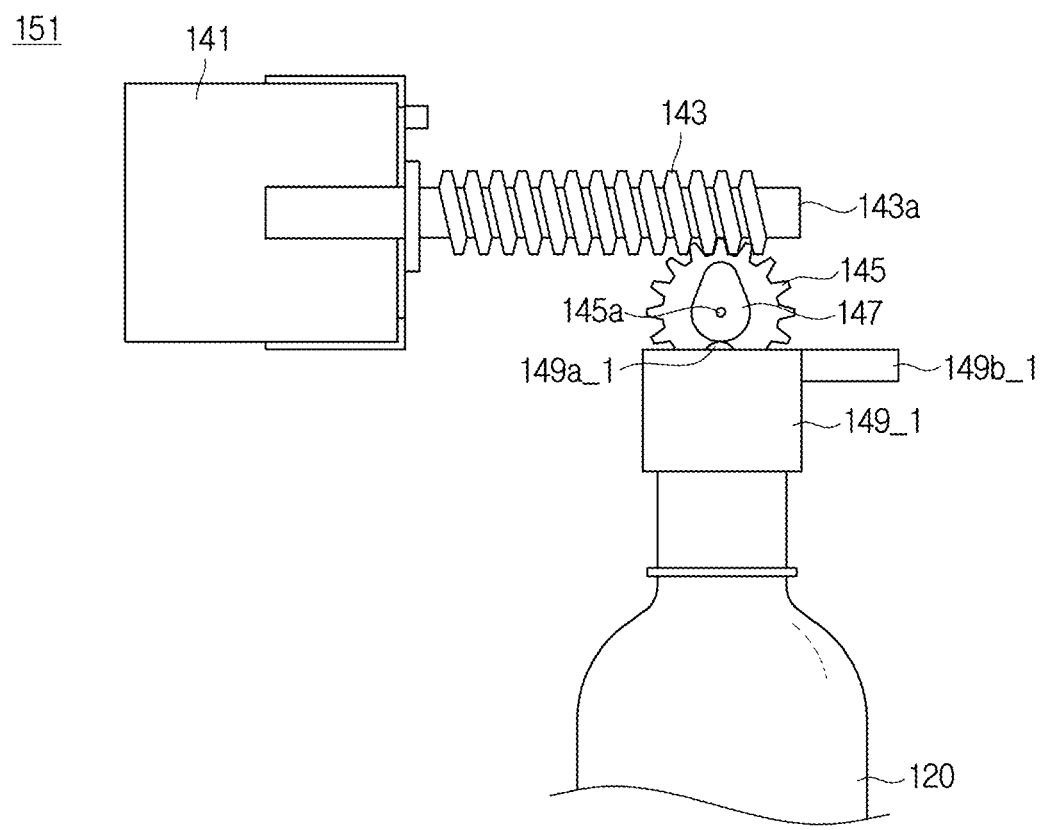
FIGS. 6A, 6B, 7A, 7B illustrate one example of a carbon dioxide supply valve included in the refrigerator according to one embodiment of the present disclosure refrigerator.
Figure 6B:
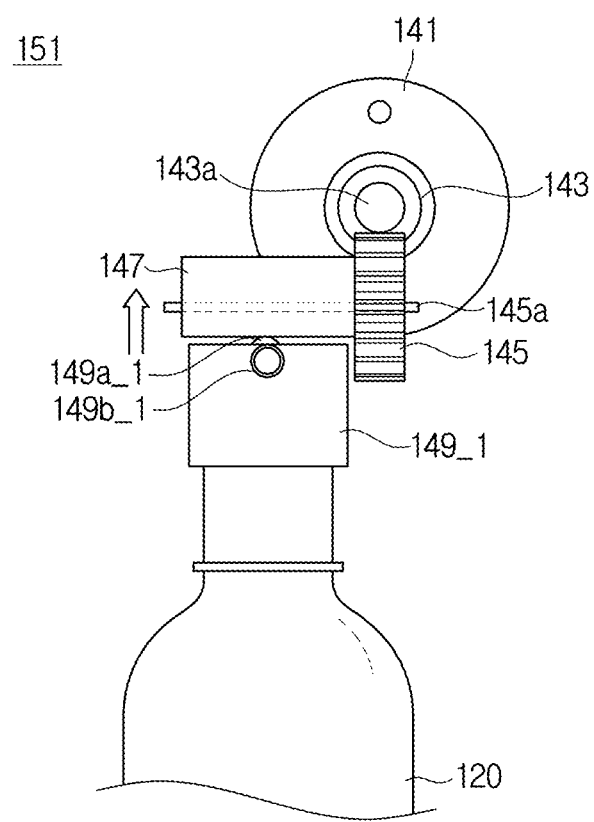

Specifically, as illustrated in FIGS. 6A and 6B, when the outer circumferential surface of the eccentric rotation member 147 in a downward direction is positioned at a minimum distance from the worm wheel rotation shaft 145a, the eccentric rotation member 147 does not press the carbon dioxide discharge button 149a_1, and carbon dioxide is not discharged from the carbon dioxide cylinder 120.

In other words, the carbon dioxide supply valve 151 is closed.

Figure 7A:
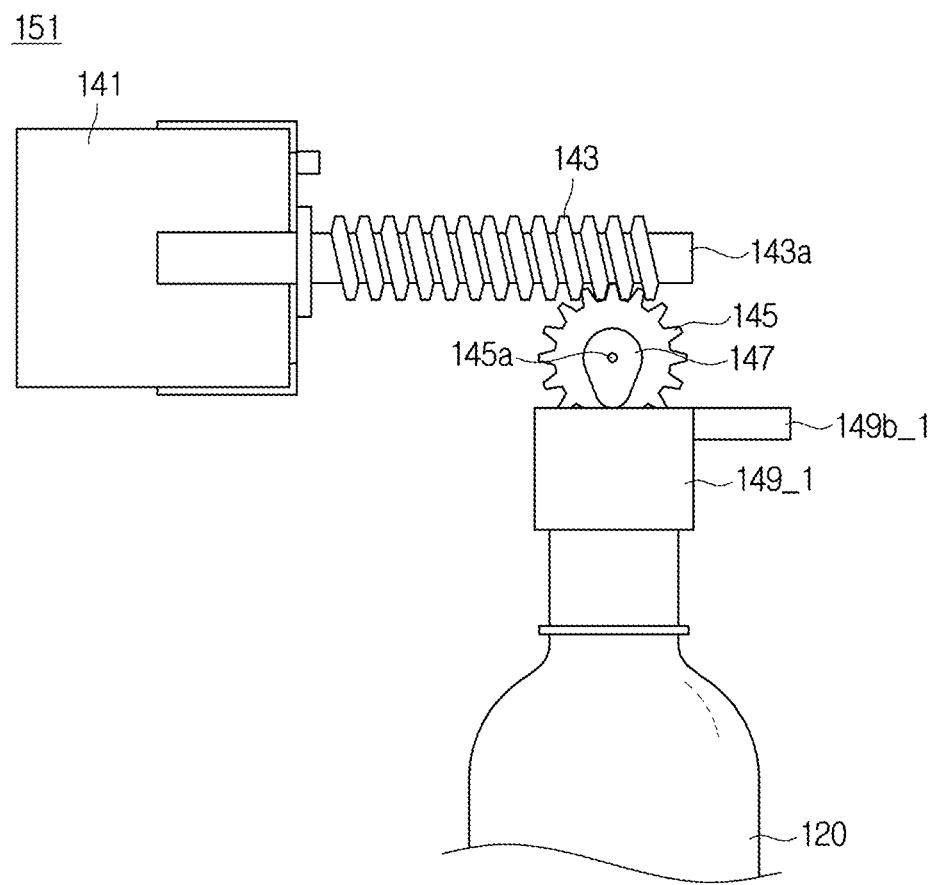
Figure 7B:
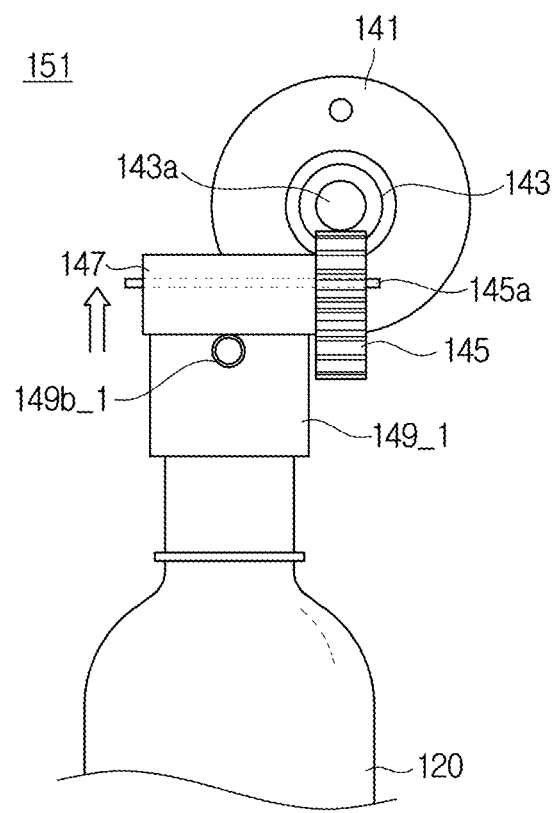

As illustrated in FIGS. 7A and 7B, when the outer circumferential surface of the eccentric rotation member 147 in a downward direction is positioned at maximum distance from the worm wheel rotation shaft 145a, the eccentric rotation member 147 presses the carbon dioxide discharge button 149a_1, and carbon dioxide is discharged from the carbon dioxide cylinder 120.

In other words, the carbon dioxide supply valve 151 is opened.

FIGS. 8A, 8B, 9A, and 9B illustrate another example of the carbon dioxide supply valve included in the refrigerator.

The carbon dioxide supply valve 151 may include a carbon dioxide discharge member 149_2, a carbon dioxide supply motor 141, a worm gear 143, a worm wheel 145, an eccentric rotation member 147.

The carbon dioxide discharge member 149_2 may be installed at a carbon dioxide exit of the carbon dioxide cylinder 120, and the carbon dioxide discharge member 149_2 may include a carbon dioxide discharge pipe 149b_2 through which carbon dioxide is discharged, a carbon dioxide discharge button 149a_2 for controlling discharge of carbon dioxide of the carbon dioxide cylinder, and a carbon dioxide discharge bar 149c_2 which presses the carbon dioxide discharge button 149a_2.

The carbon dioxide discharge bar 149c_2 may press the carbon dioxide discharge button 149a_2 using an external force, and when the carbon dioxide discharge button 149a_2 is pressed, carbon dioxide stored in the carbon dioxide cylinder 120 is discharged to the carbon dioxide discharge pipe 149b_2. In addition, when the carbon dioxide discharge button 149a_2 is not pressurized, the carbon dioxide stored in the carbon dioxide cylinder 120 is not discharged.

The carbon dioxide supply motor 141, the worm gear 143, the worm wheel 145, and the eccentric rotation member 147 are respectively the same as the carbon dioxide supply motor 141, the worm gear 143, the worm wheel 145, and the eccentric rotation member 147 described in FIGS. 6A, 6B, 7A, and 7B.

In addition, by using a change of the distance between an outer surface of the carbon dioxide discharge button 149a_2 in contact with the outer circumferential surface of the eccentric rotation member 147 and the rotation shaft while the eccentric rotation member 147 is rotating, the eccentric rotation member 147 may press the carbon dioxide discharge button 149a_2 through the carbon dioxide discharge bar 149c_2, or release the pressure.

Figure 8A:
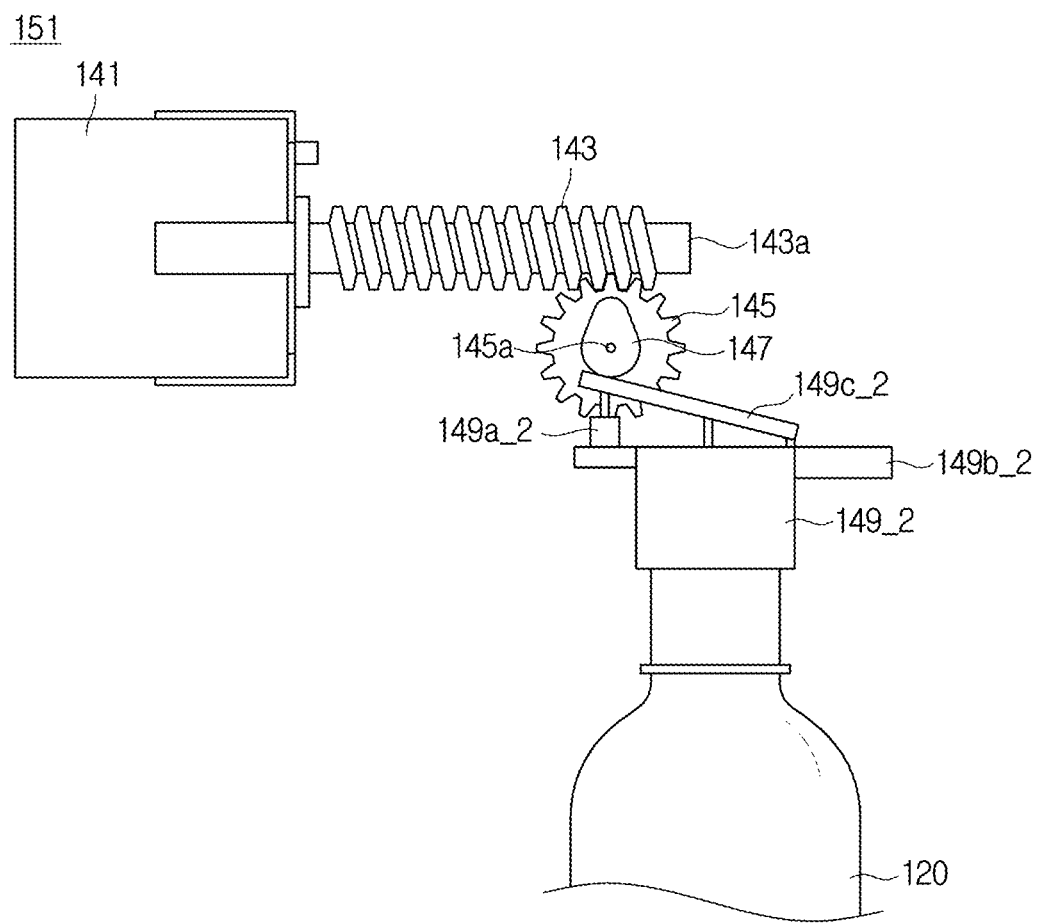
FIGS. 8A, 8B, 9A, and 9B illustrate another example of the carbon dioxide supply valve included in the refrigerator according to one embodiment of the present disclosure.
Figure 8B:
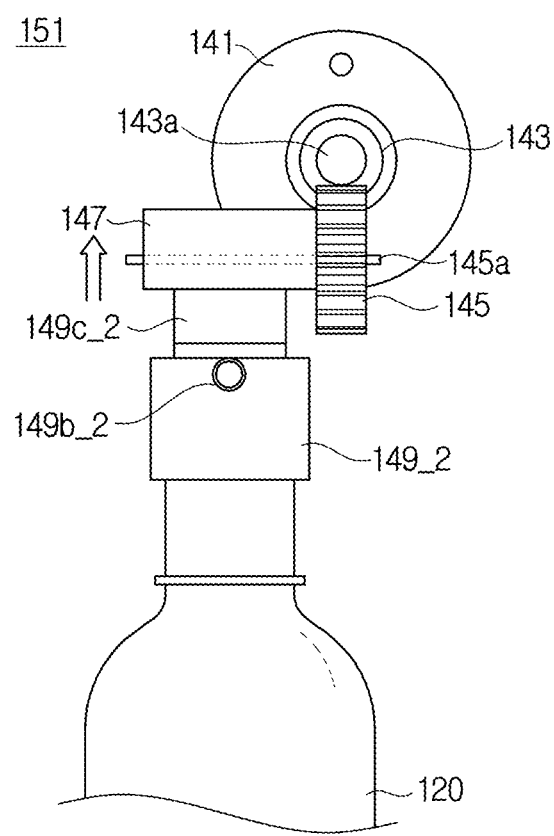

Specifically, as illustrated in FIGS. 8A and 8B, when an outer circumferential surface of the eccentric rotation member 147 positioned at a downward direction is positioned at a minimum distance from a worm wheel rotation shaft 145a, the eccentric rotation member 147 does not press the carbon dioxide discharge button 149a_2 through the carbon dioxide discharge bar 149c_2, and carbon dioxide is not discharged from the carbon dioxide cylinder 120.

In other words, the carbon dioxide supply valve 151 is closed.

Figure 9A:
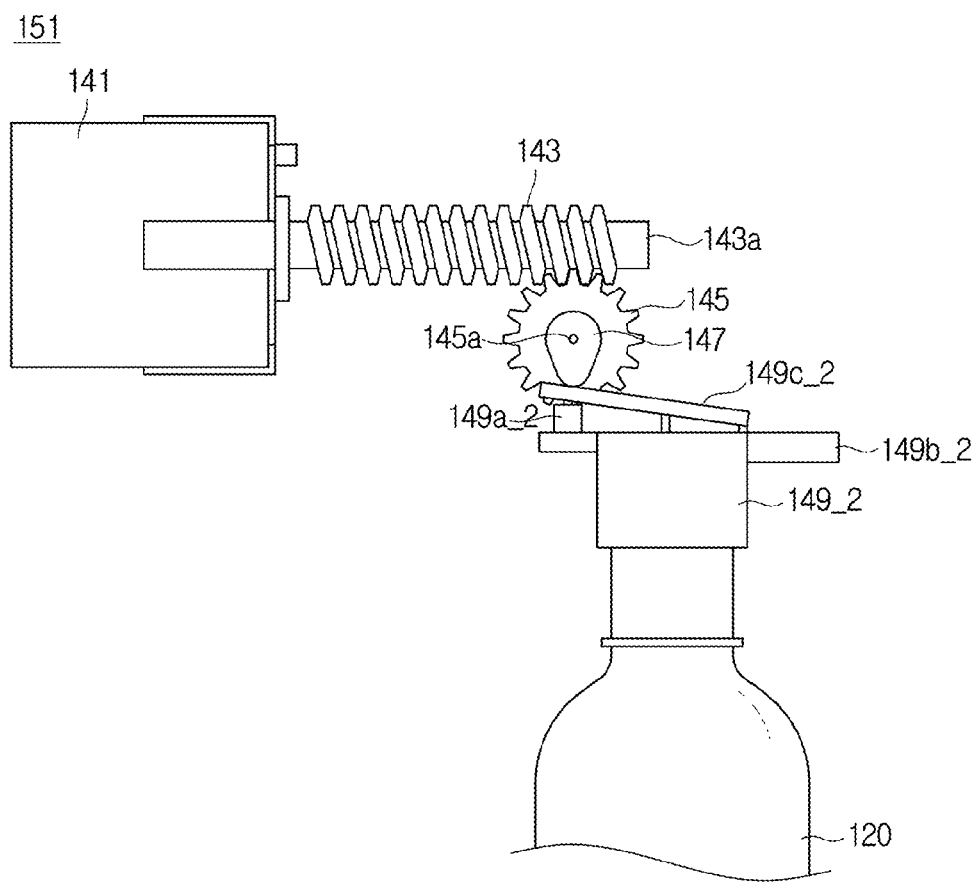
Figure 9B:
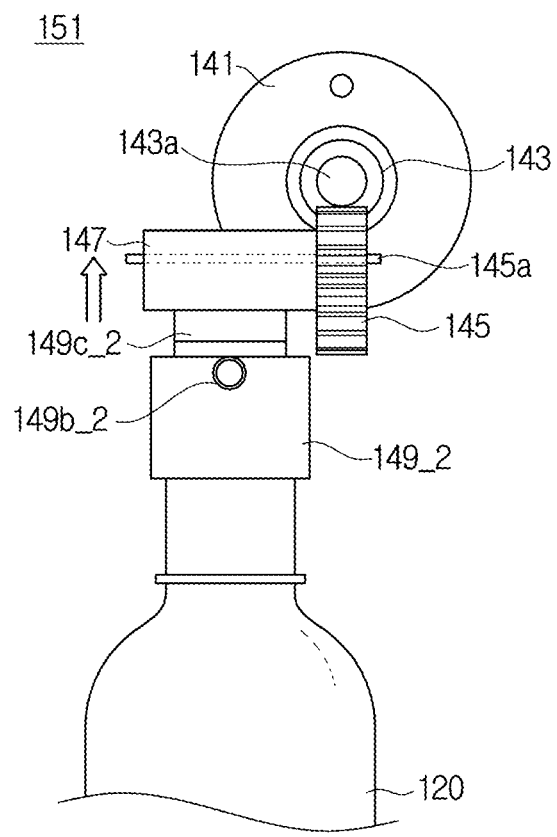

As illustrated in FIGS. 9A and 9B, when the outer circumferential surface of the eccentric rotation member 147 in the downward direction is positioned at a maximum distance from the worm wheel rotation shaft 145a, the eccentric rotation member 147 presses the carbon dioxide discharge button 149a_2 through the carbon dioxide discharge bar 149c_2, and carbon dioxide is discharged from the carbon dioxide cylinder 120.

In other words, the carbon dioxide supply valve 151 is opened.

When the carbon dioxide discharge button 149a_2 is pressed using the carbon dioxide discharge bar 149c_2 as described above, as illustrated in FIGS. 6A, 6B, 7A, and 7B, a movement displacement of the carbon dioxide discharge button 149a_1 increases compared to a case when the carbon dioxide discharge button 149a_1 is directly pressed.

Since the movement displacement of the carbon dioxide discharge button 149a_2 increases, a distance between a center of the eccentric rotation member 147 and the rotation shaft may be further increased, and a pressurization force by the eccentric rotation member 147 may be further increased.

In other words, the eccentric rotation member 147 may press the carbon dioxide discharge button 149a_2 with a small turning force of the carbon dioxide supply motor 141.

The above-described carbon dioxide supply valve 151 illustrated in FIGS. 6B to 9B merely illustrates one example of a discharge means applied to the refrigerator 1 according to one embodiment, but it is not limited thereto.

For example, the carbon dioxide supply valve 151 may not include the worm gear 143 and the worm wheel 145, and the carbon dioxide supply motor 141 and the eccentric rotation member 147 may rotate about the same rotation shaft. That is, a turning force generated by the carbon dioxide supply motor 141 may be directly transmitted to the eccentric rotation member 147.

In addition, the carbon dioxide supply valve 151 illustrated in FIGS. 6A to 9B may sense a rotation displacement of the carbon dioxide supply motor 141 through a rotation sensor including an optical sensor or a hall sensor, and may adjust a pressure and an amount of supplied carbon dioxide.

The optical sensor may include a light source and a receiver respectively provided at the front and the rear with respect to the worm wheel 145. In addition, as holes through which light emitted from the light source can pass is provided in the worm wheel 145, a rotation displacement may be calculated based on preset data with reference to a distance of the holes provided in the worm wheel 145.

In addition, although kinds of light generated and emitted from the light source may include an infrared light and a laser, it is not limited thereto.

The hall sensor may be provided at one side of a stator to sense a rotation displacement of a rotor.

Specifically, the hall sensor may use an N type semiconductor and may show a magnetic field in a voltage through hall effect. Accordingly, as the hall sensor may sense a change of a magnetic field due to a rotation of the rotor, an angle, a frequency, an operation time, and the like related to a rotation displacement of the rotor may be output.

For a method for sensing a rotation displacement of the rotor, an angle sensor such as a resolver, a potentiometer, an absolute encoder, and an incremental encoder as well as the hall sensor may be used.

Specifically, the resolver which is a kind of rotary transformer, is an analog type angle sensor which outputs an alternating current (AC) voltage proportional to a position of the rotor connected to a motor shaft, and the potentiometer is an angle sensor which calculates an electric input directly proportional to an rotation angle by varying a variable resistance value according to an angle. In addition, the absolute encoder is an angle sensor which detects a corresponding position with a certain rotation using an optic pulse wave without setting a reference position, and the incremental encoder is an angle sensor which sets a reference position and calculates an angle using an increase or decrease of a measured angle with respect to the reference position, and detects a corresponding position with a certain rotation using an optic pulse wave.

Besides above, various kinds of sensors which measure an angle and a frequency may be used as one example of the hall sensor.

In addition, although one hall sensor may be provided, two or more, or three or more of hall sensors may also be provided. The number of hall sensors to be provided may be determined by considering an error range and the like of a rotation displacement to be sensed.

In addition, the optical sensor and the hall sensor for sensing a rotation displacement of the carbon dioxide supply motor 141 are exemplified, but it is not limited thereto, and various methods for sensing the rotation displacement of the carbon dioxide supply motor 141 may be used as one example.

Figure 10:
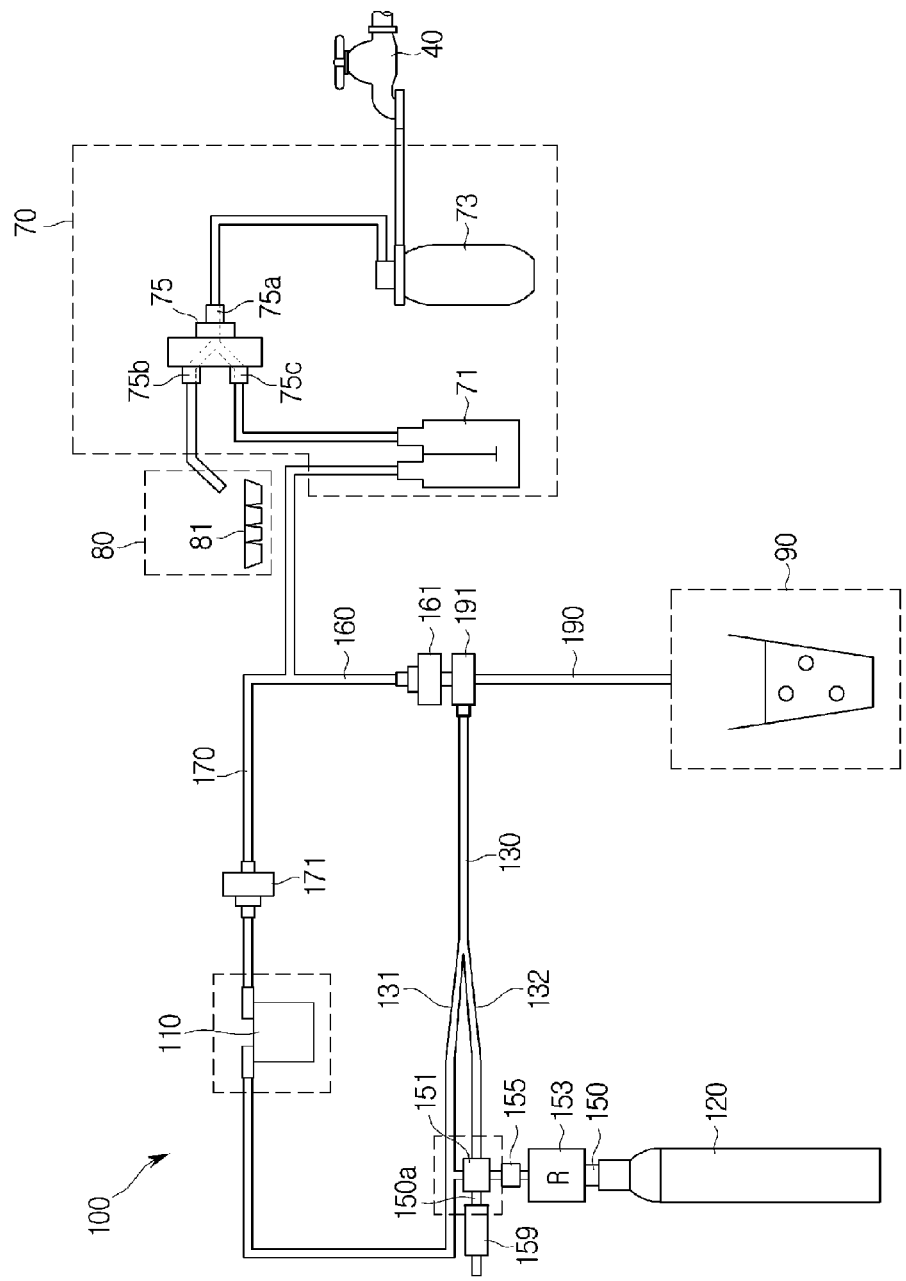
FIG. 10 illustrates one example of a carbonated water production module and a purified water supply module included in the refrigerator according to one embodiment of the present disclosure.

FIG. 10 illustrates one example of a carbonated water production module and a purified water supply module included in the refrigerator.

The refrigerator may include a dispenser module 90, a purified water supply module 70, a carbonated water production module 100, and an ice-making room 80.

The dispenser module 90 receives inputs of a user to transmit a water-purifying operation, an ice-making operation, and a carbonated water producing operation, and the like to a controller 500. The dispenser module 90 may be the same as or different from the dispenser module 90 described with reference to FIGS. 5A and 5B.

The purified water supply module 70 may include a purified water tank 71 which stores purified water, a water-purifying filter 73 which purifies water supplied from a water source 40, and a flow path switching valve 75 which distributes purified water to an ice-making unit 81 or the purified water tank 71.

The purified water supply module 70 supplies purified water which is discharged through the dispenser module 90 or is used for a carbonated water production.

As illustrated in FIG. 10, the purified water supply module 70 may include the purified water tank 71 which stores purified water, the water-purifying filter 73 which purifies water supplied from the water source 40, the flow path switching valve 75 which distributes purified water to the ice-making unit 81 or the purified water tank 71, and the ice-making unit 81.

The purified water tank 71 may be provided in a plurality of storage boxes 27 as described above, and the water-purifying filter 73 may be provided at a vicinity of a center of the purified water tank 71.

The flow path switching valve 75 may be implemented with a three way valve including an inlet 75a connected to the water-purifying filter 73, a first outlet 75b connected to the ice-making unit 81, and a second outlet 75c connected to the purified water tank 71.

The flow path switching valve 75 may supply purified water supplied from the water-purifying filter 73 to any one of the purified water tank 71 and the ice-making unit 81.

Specifically, when an ice-making operation is not required, the flow path switching valve 75 opens a flow path of a side of the purified water tank 71 and closes a flow path of a side of the ice-making unit 81 for supplying purified water to the purified water tank 71.

In addition, when an ice-making operation is required, the flow path switching valve 75 closes the flow path of the side of the purified water tank 71 and opens the flow path of the side of the ice-making unit 81 for supplying purified water to the ice-making unit 81.

In addition, the purified water supply module 70 illustrated in FIG. 10 is also merely one example of a means of supplying purified water which may be adopted in the refrigerator 1 according to one embodiment, but it is not limited thereto.

The carbonated water production module 100 may include a unified discharge path 190 which discharges carbonated water or purified water, a purified water pump 110 which pumps purified water for producing carbonated water, a carbon dioxide cylinder 120 which stores carbon dioxide, a mixing pipe 130 which mixes purified water output from the purified water pump 110 and carbon dioxide output from the carbon dioxide cylinder 120, a purified water supply path 170 which guides purified water from the purified water supply module 70 to the purified water pump 110, a carbon dioxide supply path 150 which guides carbon dioxide from the carbon dioxide cylinder 120 to the mixing pipe 130, and a purified water discharge path 160 which guides purified water from the purified water supply module 70 to the unified discharge path 190.

The purified water supply path 170 guides purified water supplied from the purified water supply module 70 to the purified water pump 110, and a check valve 171 which prevents backflow of purified water is provided in the purified water supply path 170.

The purified water pump 110 pumps purified water supplied from the purified water supply module 70 to the mixing pipe 130. The high pressure purified water pumped by the purified water pump 110 is mixed with carbon dioxide in the mixing pipe 130.

Specifically, the purified water pump 110 may increase a pressure of water supplied from the purified water supply module 70 through the purified water supply path 170. When a target pressure is determined by the controller 500, the purified water pump 110 may increase a pressure of water to the target pressure to deliver the water having the same pressure as that of carbon dioxide decreased by the carbon dioxide regulator 153 to the mixing pipe 130. In this case, the pressure of water may be increased to 5 to 9 bar, which is a high pressure.

In addition, the purified water pump 110 may adjust a carbonated water concentration by adjusting a pressure and an amount of water which will be supplied, based on a target concentration input by a user through the user interface 200.

The carbon dioxide cylinder 120 may store high pressure carbon dioxide having an approximately 45 to 60 bar. Carbon dioxide stored in the carbon dioxide cylinder 120 may be supplied to the mixing pipe 130 through the carbon dioxide supply path 150.

The carbon dioxide supply path 150 guides carbon dioxide stored in the carbon dioxide cylinder 120 to the mixing pipe 130.

A carbon dioxide supply valve 151 which opens/closes the carbon dioxide supply path 150, a carbon dioxide regulator 153 which adjusts a pressure of carbon dioxide, a carbon dioxide pressure sensor 155 which senses a discharge pressure of carbon dioxide in the carbon dioxide cylinder 120, and a safety valve 159 which automatically discharges carbon dioxide in the carbon dioxide supply path 150 to the outside when an internal pressure of the dioxide supply path 150 is greater than a reference pressure are provided in the carbon dioxide supply path 150.

The carbon dioxide supply valve 151 opens or closes the carbon dioxide supply path 150.

When the carbon dioxide supply valve 151 is opened, carbon dioxide stored in the carbon dioxide cylinder 120 is mixed with purified water pumped by the purified water pump 110 in the mixing pipe 130, and carbonated water is produced.

A pilot valve which is opened/closed due to purified water supplied to the mixing pipe 130 may be adopted as such a carbon dioxide supply valve 151. In addition, a solenoid valve which opens/closes the carbon dioxide supply path 150 using an electrical signal may also be adopted as the carbon dioxide supply valve 151

Specifically, the carbon dioxide supply valve 151 is opened due to a pressure of purified water supplied to the mixing pipe 130, when purified water is supplied to mixing pipe 130, the carbon dioxide supply valve 151 is opened, and when purified water is not supplied to the mixing pipe 130, the carbon dioxide supply valve 151 is closed.

However, the carbon dioxide supply valve 151 is not limited to the pilot valve. For example, the solenoid valve which is independently operated with the purified water pump 110 may also be adopted as the carbon dioxide supply valve 151.

The carbon dioxide regulator 153 may be provided at a carbon dioxide discharge hole of the carbon dioxide cylinder 120 to adjust a pressure of carbon dioxide discharged from the carbon dioxide cylinder 120.

Specifically, the carbon dioxide regulator 153 may decrease a pressure of carbon dioxide supplied to the mixing pipe 130. When a target pressure is determined by the controller 500, the carbon dioxide regulator 153 may decrease a pressure of carbon dioxide to the target pressure to deliver the carbon dioxide to the mixing pipe in the same pressure as that of water increased at the purified water pump 110. In this case, the pressure of carbon dioxide may be decreased to 6 to 9 bar, which is a high pressure.

In addition, the carbon dioxide regulator 153 may adjust a carbonated water concentration by adjusting a pressure and an amount of carbon dioxide which will be supplied, based on a target concentration input by a user through the user interface 200.

The carbon dioxide pressure sensor 155 is provided at the carbon dioxide discharge hole of the carbon dioxide regulator 153 to sense a pressure of carbon dioxide depressurized by the carbon dioxide regulator 153.

A pressure switch may be adopted as such a carbon dioxide pressure sensor 155 so that, when a pressure of carbon dioxide depressurized by the carbon dioxide regulator 153 is equal to or less than a predetermined reference supply pressure, the pressure switch outputs a low pressure sensing signal corresponding thereto.

The safety valve 159 may be automatically opened when a pressure in the carbon dioxide supply path 150 is greater than a reference pressure, and may be provided on a carbon dioxide discharge path 150a branched from the carbon dioxide supply path 150.

The mixing pipe 130 mixes purified water output from the purified water pump 110 and carbon dioxide output from the carbon dioxide cylinder 120. Purified water and carbon dioxide are mixed in the mixing pipe 130, and carbonated water is produced.

In addition, a carbonated water concentration may be adjusted by adjusting a pressure of purified water and a pressure of carbon dioxide supplied to the mixing pipe 130. A carbonated water concentration becomes higher according to the extent to which a pressure of carbon dioxide is higher than a pressure of purified water, and a carbonated water concentration becomes lower according to the extent to which a pressure of carbon dioxide is lower than a pressure of purified water.

In addition, a discharge amount of carbonated water may vary according to a pressure of purified water and a pressure of carbon dioxide supplied to the mixing pipe 130.

When a pressure of purified water is greater than a pressure of carbon dioxide, a discharge amount of carbonated water is determined by the pressure of the purified water, and when a pressure of purified water is equal to or less than a pressure of carbon dioxide, a discharge amount of carbonated water is affected by both of the pressure of the purified water and the pressure of the carbon dioxide.

As a result, when a pressure of purified water and a pressure of carbon dioxide are the same, a most amount of carbonated water having a constant concentration may be discharged. In other words, it is preferable that a pressure of purified water and a pressure of carbon dioxide supplied to the mixing pipe 130 be the same.

However, it is not limited thereto, and carbonated water having various concentrations may be produced by variously adjusting a ratio of a pressure of purified water to a pressure of carbon dioxide.

The purified water discharge path 160 guides purified water supplied from the purified water supply module 70 to the unified discharge path 190, and a purified water discharge valve 161 which opens/closes the purified water discharge path 160 is provided on the purified water discharge path 160.

The unified discharge path 190 guides carbonated water or purified water to the dispenser module 90, and a carbonated water discharge valve 191 which controls discharge of carbonated water is provided at the unified discharge path 190.

As illustrated in FIG. 10, a three way valve which connects the unified discharge path 190 to any one of the mixing pipe 130 and the purified water discharge path 160 may be adopted as the carbonated water discharge valve 191.

However, the carbonated water discharge valve 191 is not limited to the three way valve. For example, when a flow path having an alphabetical character "Y" shape is adopted as the unified discharge path 190, a two way valve provided at the unified discharge path 190 and the mixing pipe 130 may also be adopted as the carbonated water discharge valve 191.

As described above, the carbonated water production module 100 may supply purified water and carbon dioxide to the mixing pipe 130, and produce and discharge carbonated water at the mixing pipe 130.

Hereinafter, a concept in which water or carbon dioxide is supplied to the purified water module, the carbonated water production module, and the ice-making room described with reference to FIG. 10 will be described with reference to FIGS. 11A to 11O.

Figure 11A:
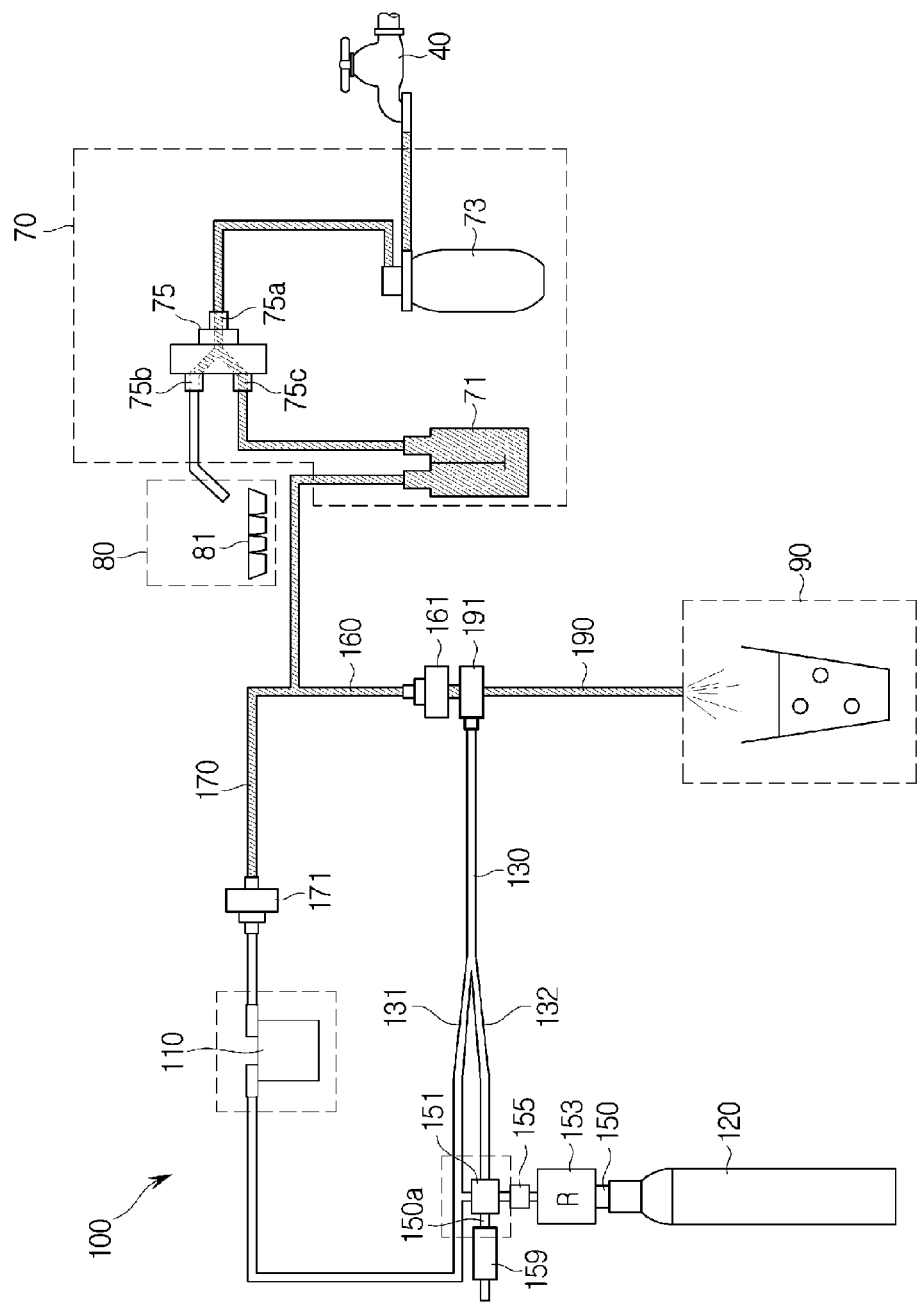
FIG. 11A illustrates one example of an operation of purifying water using the carbonated water production module and the purified water supply module according to one embodiment of the present disclosure.

FIG. 11A illustrates one example of an operation of purifying water using the carbonated water production module and the purified water supply module.

When the dispenser module 90 receives a command for a water-purifying operation, the controller 500 may control the refrigerator 1 to discharge purified water to the unified discharge path 190.

Specifically, water supplied from the water source 40 may be filtered through the water-purifying filter 73, become purified water in which contaminants are removed, and move to the flow path switching valve 75.

The water moved to the flow path switching valve 75 may not flow into the ice-making room 80 as the first outlet 75b is closed based on an operation determined by the controller 500, and may move to the purified water tank 71 as the second outlet 75c is opened.

In addition, a temperature of the water moved to the purified water tank 71 may be adjusted to a target temperature input by a user through the user interface 200.

In addition, the water of which the temperature is adjusted to the target temperature in the purified water tank 71 may be discharged to the other side different from one side through which the water flows from the second outlet 75c into the purified water tank 71. In this case, the controller 500 controls to close the check valve 171 such that the water does not flow into the purified water pump 110, and controls to open the purified water discharge valve 161 such that the water discharged from the purified water tank 71 moves to the carbonated water discharge valve 191.

In addition, the controller 500 may control such that the water does not flow into the mixing pipe 130, or the water, carbon dioxide, and carbonated water in the mixing pipe 130 do not flow into the unified discharge path 190 by closing the carbonated water discharge valve 191 not to connect the unified discharge path 190 and the mixing pipe 130. In addition, the controller 500 may move water discharged from the purified water tank 71 to a container positioned at the dispenser module 90 through the unified discharge path 190 by opening the carbonated water discharge valve 191 to connect the unified discharge path 190 and the purified water discharge path 160.

Through this, a user may obtain purified water having a target temperature.

Figure 11B:
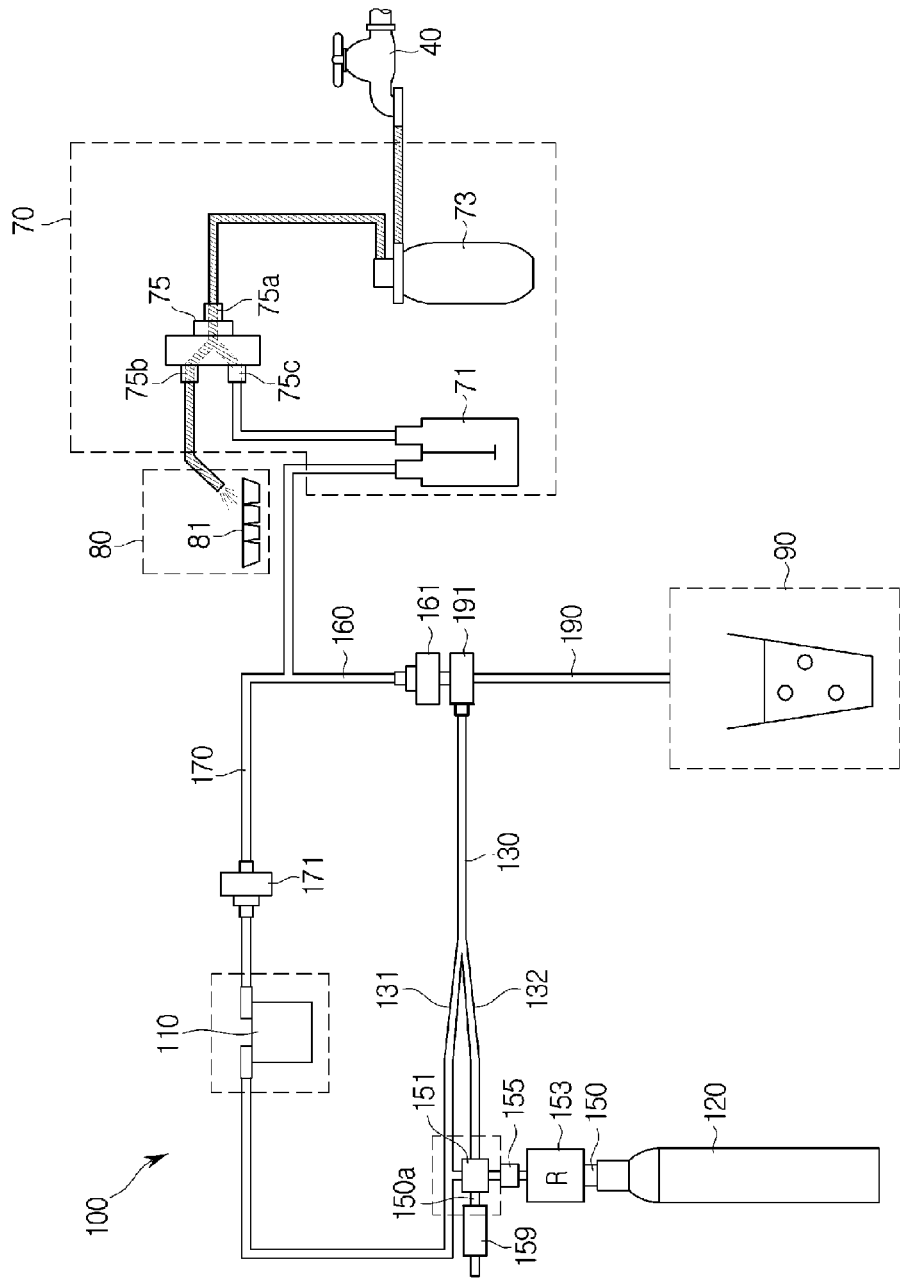
FIG. 11B illustrates one example of an operation of ice-making using the carbonated water production module and the purified water supply module according to one embodiment of the present disclosure.

FIG. 11B illustrates one example of an operation of ice-making using the carbonated water production module and the purified water supply module.

When the dispenser module 90 receives a command of an ice-making operation from a user, the controller 500 may control the refrigerator 1 to discharge ice in the ice-making room 80 to the dispenser module 90.

Specifically, water supplied from the water source 40 may be filtered by the water-purifying filter 73, become purified water in which contaminants are removed, and move to the flow path switching valve 75.

The water moved to the flow path switching valve 75 may not flow into the purified water tank 71 as the second outlet 75c is closed based on an operation determined by the controller 500, and may move to the ice-making room 80 as the first outlet 75b is opened.

The water moved to the ice-making room 80 may move to the inner ice-making unit 81, ice may be produced, and the produced ice may be discharged to the dispenser module 90.

Figure 11C:
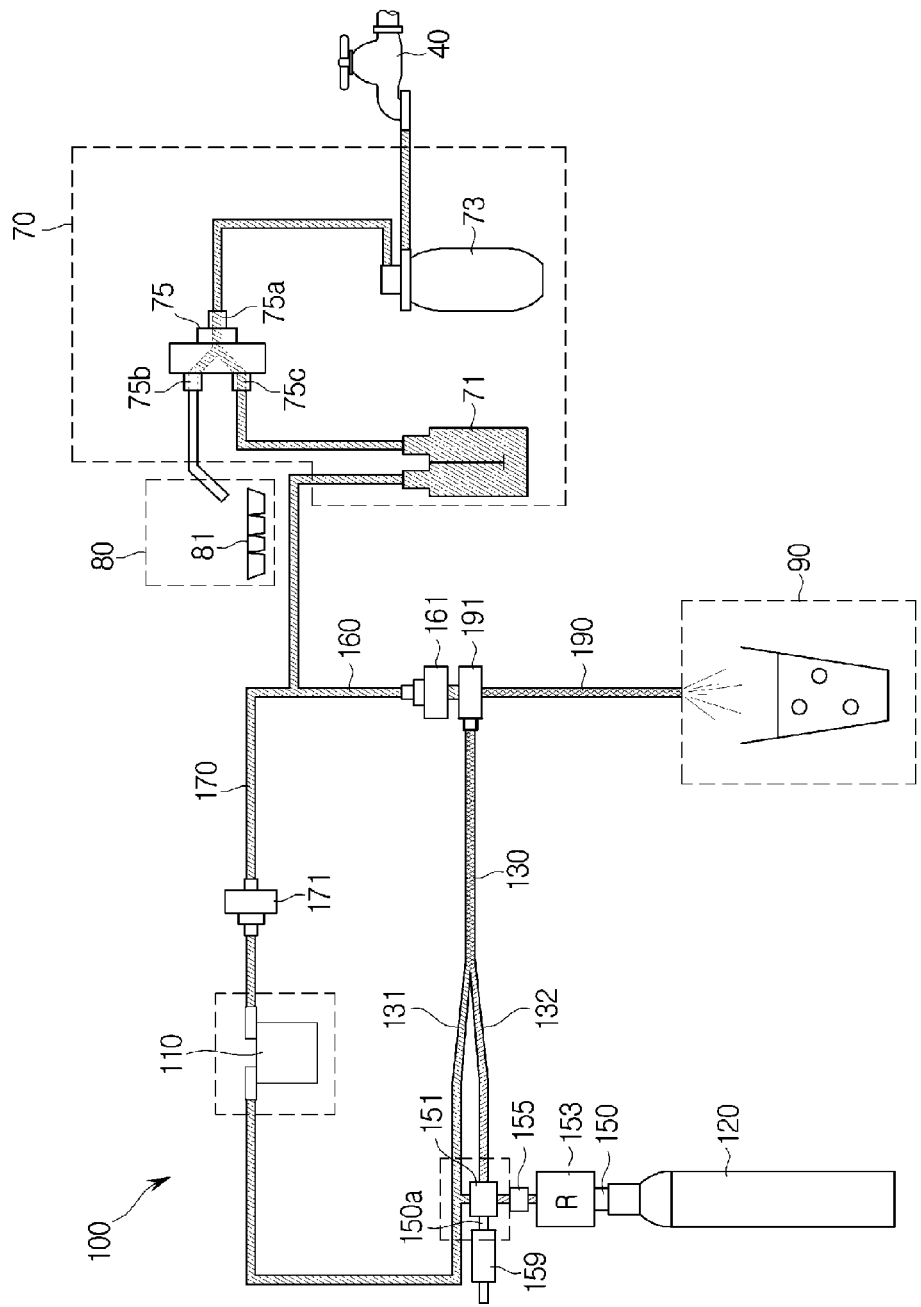
FIG. 11c illustrates one example of an operation of producing carbonated water using the carbonated water production module and the purified water supply module according to one embodiment of the present disclosure.

FIG. 11c illustrates one example of an operation of producing carbonated water using the carbonated water production module and the purified water supply module.

When the dispenser module 90 receives a command of a carbonated water producing operation from a user, the controller 500 may control the refrigerator 1 to discharge carbonated water to the unified discharge path 190.

Specifically, water supplied from the water source 40 may be filtered by the water-purifying filter 73, become purified water in which contaminants are removed, and move to the flow path switching valve 75.

The water moved to the flow path switching valve 75 may not flow into the ice-making room 80 as the first outlet 75b is closed based on an operation determined by the controller 500, and may move to the purified water tank 71 as the second outlet 75c is opened.

In addition, a temperature of the water moved to the purified water tank 71 may be adjusted to a target temperature input by a user through the user interface 200. Particularly, the purified water tank 71 may decrease a water temperature to increase solubility of carbon dioxide when carbonated water is produced.

In addition, the water of which the temperature is adjusted to the target temperature in the purified water tank 71 may be discharged to the other side different from one side through which the water flows from the second outlet 75c into the purified water tank 71. In this case, the controller 500 may control to open the check valve 171 such that the water discharged from the purified water tank 71 moves to the purified water pump 110, and control to close the purified water discharge valve 161 such that purified water does not flow into the carbonated water discharge valve 191.

The water which flows into the purified water pump 110 is subject to an increase in pressure while passing through the purified water pump 110. Specifically, a solubility of carbon dioxide in water increases when a temperature is low and a pressure is high. Since carbon dioxide is stored in the carbon dioxide cylinder 120 at a high pressure, it may be technically easy to decrease the pressure using the carbon dioxide regulator 153, but it may be difficult to increase a pressure of water using a conventional purifying water regulator. Accordingly, by generating high pressure water using the purified water pump 110, solubility of carbon dioxide may be increased, and thus efficiency of a carbonated water production may be increased. For example, the purified water pump 110 may increase a pressure of water to a range of 5 to 9 bar. In addition, water of which a pressure is increased in the purified water pump 110 may move to the mixing pipe 130 through a purified water inlet pipe 131.

In addition, carbon dioxide stored in the carbon dioxide cylinder 120 is delivered to the carbon dioxide regulator 153 through the carbon dioxide supply path 150, and the carbon dioxide regulator 153 may increase a pressure of the carbon dioxide. Since solubility is increased when a pressure of water and a pressure of carbon dioxide in the mixing pipe 130 are the same, the carbon dioxide regulator 153 may decrease a pressure of carbon dioxide to the same pressure as a pressure of water which is increased by the purified water pump 110. For example, the carbon dioxide regulator 153 may decrease a pressure of carbon dioxide to a range of 6 to 9 bar. Such a decreasing pressure of carbon dioxide is sensed by the pressure sensor 155, and driving of the carbon dioxide regulator 153 may be controlled to be adjusted. In addition, carbon dioxide of which a pressure is decreased in the carbon dioxide regulator 153 may move to the mixing pipe 130 through a carbon dioxide inlet pipe 132.

High pressure water which flows into the mixing pipe 130 through the purified water inlet pipe 131, and high pressure carbon dioxide which flows into the mixing pipe 130 through the carbon dioxide inlet pipe 132 may be mixed in the mixing pipe 130, and carbonated water may be produced. A method which improves efficiency of mixing water and carbon dioxide will be described in detail with reference to FIG. 13 below.

In addition, carbonated water produced in the mixing pipe 130 passes through the carbonated water discharge valve 191. The carbonated water discharge valve 191 may connect the mixing pipe 130 and the unified discharge path 190 and close the mixing pipe 130 and the purified water discharge path 160 to discharge carbonated water to the dispenser module 90.

Figure 12:
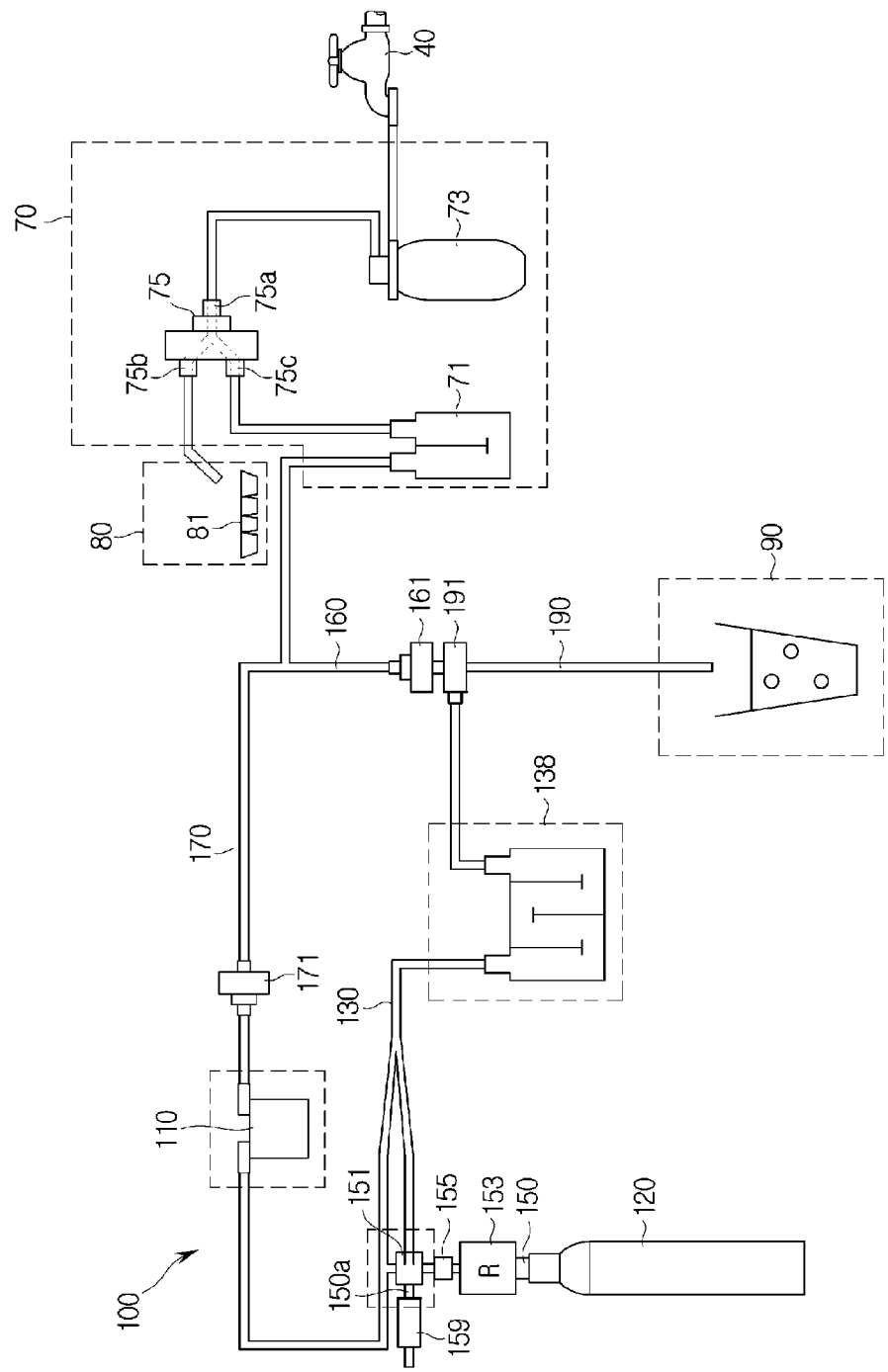
FIG. 12 illustrates another example of the carbonated water production module and the purified water supply module included in the refrigerator according to one embodiment of the present disclosure.

FIG. 12 illustrates another example of the carbonated water production module and the purified water supply module included in the refrigerator.

When carbonated water is produced using a mixing pipe 130 as described above, and directly discharged to a dispenser module 90 through a unified discharge path 190, a bubble size in the carbonated water may be large. Because of this, a feeling of refreshment that a user feels may be varied. When small-sized bubbles are desired according to a user taste, carbonated water is needed to be matured and supplied. Accordingly, carbonated water produced in the mixing pipe 130 may be stored and matured in a carbonated water tank 138.

Referring to FIG. 12, a purified water supply module 70 is the same as the purified water supply module 70 described above and illustrated in FIG. 10.

In addition, a carbonated water production module 100 further includes the carbonated water tank 138 compared to the carbonated water production module 100 illustrated in FIG. 10.

The carbonated water tank 138 may be provided between the mixing pipe 130 and a carbonated water discharge valve 191, and may temporarily store carbonated water produced in the mixing pipe 130.

Carbon dioxide may dissolve in purified water while carbonated water produced in the mixing pipe 130 is stored in the carbonated water tank 138, and the concentration of carbonated water discharged through the dispenser module 90 may be higher compared to a case when there is no carbonated water tank 138. Through this, as the bubble size in carbonated water is decreased, feeling of refreshment that a user feels may be differentiated.

In addition, the carbonated water tank 138 may buffer a supply pressure of purified water due to a purified water pump 110 and a supply pressure of carbon dioxide output from a carbon dioxide cylinder 120. In other words, the carbonated water tank 138 may prevent high pressure carbonated water from being discharged when the purified water pump 110 starts an operation.

In addition, as the carbonated water tank 138 includes a water level sensor, the carbonated water tank 138 may sense a water level of carbonated water stored in the carbonated water tank 138 to determine an additional carbonated water production. For example, when a value sensed by the water level sensor is equal to or less than a preset water level, a controller may control to produce carbonated water until the water level in the carbonated water tank 138 is greater than the preset water level.

Various types of sensors may be adopted as the water level sensor.

For example, when the carbonated water tank 138 is formed of a transparent material, an infrared sensor may be adopted as the water level sensor.

The infrared sensor may include an infrared emitting module which emits infrared light, and an infrared receiving module which receives infrared light emitted by the infrared emitting module.

The infrared emitting module and the infrared receiving module may be installed on both walls of a water-dispensing space. Specifically, the infrared emitting module and the infrared receiving module may be installed at both sides with respect to the carbonated water tank 138.

For example, when the infrared emitting module is installed at a left wall of the water-dispensing space, the infrared receiving module may be installed at a right wall of the water-dispensing space. In addition, when the infrared emitting module is installed at the right wall of the water-dispensing space, the infrared receiving module may be installed at the left wall of the water-dispensing space.

In addition, the infrared emitting module and the infrared receiving module may be installed at a position corresponding to a maximum water level of the carbonated water tank 138.

When a water level of carbonated water accommodated in the carbonated water tank 138 does not reach the maximum water level, infrared light emitted by the infrared emitting module may reach the infrared receiving module.

On the contrary, when a water level of carbonated water accommodated in the carbonated water tank 138 reaches the maximum water level, infrared light emitted from the infrared emitting module is scattered due to the carbonated water accommodated in the carbonated water tank 138, and the infrared receiving module may receive the infrared light having a small intensity.

In other words, when intensity of infrared light sensed by the infrared receiving module is greater than a first reference intensity, the refrigerator 1 may determine that a water level of carbonated water accommodated in the carbonated water tank 138 does not reach the maximum water level.

In addition, when intensity of infrared light sensed by the infrared emitting module is equal to or less than the first reference intensity, the refrigerator 1 may determine that a water level of carbonated water accommodated in the carbonated water tank 138 reaches the maximum water level.

For another example, when the carbonated water tank 138 is formed of an opaque material, a load cell may be adopted as the water level sensor.

The load cell may include an elastic body proportionally transformed due to an external force and a strain gauge of which electric resistance varies according to transform of the elastic body. The load cell detects a magnitude of an external force or a weight of an object by measuring an electric resistance of the strain gauge, and outputs an electric signal corresponding to the detected external force or the detected weight.

Such a load cell may be installed at a container locking protrusion of a seating member included in the carbonated water tank 138.

Since the container locking protrusion of the seating member supports the carbonated water tank 138 such that the carbonated water tank 138 is not separated from the seating member, an external force which is the same as a weight of the carbonated water tank 138 is applied to a top surface of the container locking protrusion. Accordingly, when the load cell is installed on the top surface of the container locking protrusion, the load cell may detect the weight of the carbonated water tank 138.

A weight of the carbonated water tank 138 gradually increases when more water is accommodated in the carbonated water tank 138.

In addition, a weight of the carbonated water tank 138 corresponding to a case when a water level of water accommodated in the carbonated water tank 138 is the maximum water level may be set as a reference weight.

At this time, when a weight of the carbonated water tank 138 is equal to or greater than the reference weight, the refrigerator 1 may determine that a water level of carbonated water accommodated in the carbonated water tank 138 reaches the maximum water level, and when a weight of the carbonated water tank 138 is less than the reference weight, the refrigerator 1 may determine that a water level of carbonated water accommodated in the carbonated water tank 138 does not reach the maximum water level.

Figure 13:
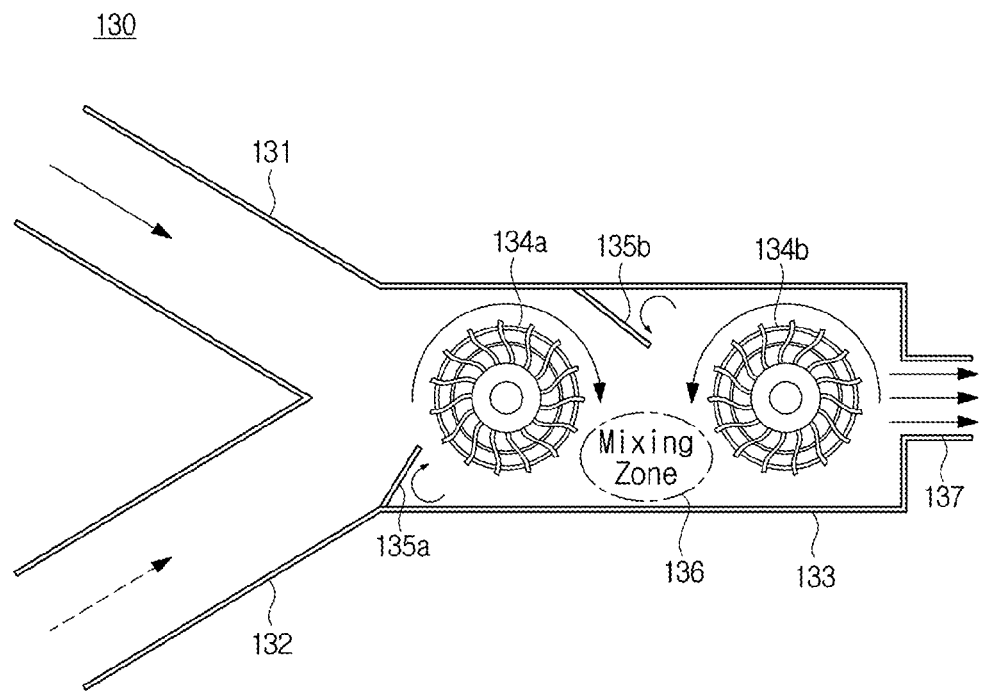
FIG. 13 illustrates a concept in which water and carbon dioxide are mixed in a mixing pipe according to one embodiment of the present disclosure and carbonated water is produced.

FIG. 13 illustrates a concept in which water and carbon dioxide are mixed in a mixing pipe and carbonated water is produced.

The mixing pipe 130 may mix water and carbon dioxide which flow thereinto, to generate carbonated water. In addition, the mixing pipe 130 may include a purified water inlet pipe 131, a carbon dioxide inlet pipe 132, a first mixing pipe 133, and a second mixing pipe 137.

The purified water inlet pipe 131 may provide a path in which high pressure purified water received from the purified water pump 110 flows into the mixing pipe 130, and the carbon dioxide inlet pipe 132 may provide a path in which high pressure carbon dioxide received from the carbon dioxide regulator 153 flows into the mixing pipe 130. In addition, although the purified water inlet pipe 131 and the carbon dioxide inlet pipe 132 may have the same inner diameter as purified water and carbon dioxide are supplied with the same pressure, the purified water inlet pipe 131 and the carbon dioxide inlet pipe 132 may have different inner diameters according to an average target concentration of carbonated water produced in the refrigerator 1.

The first mixing pipe 133 may be a space in which purified water which flows through the purified water inlet pipe 131 and carbon dioxide which flows through the carbon dioxide inlet pipe 132 are mixed, the carbon dioxide dissolves in the purified water by mixing, and carbonated water is produced. In addition, the first mixing pipe 133 may include impellers 134a and 134b and mixing partitions 135a and 135b.

The impellers 134a and 134b may be provided at a center in the first mixing pipe 133, and provide a turning force such that a flow of purified water and carbon dioxide which flow into is changed and is converged on a mixing region 136. Specifically, as illustrated in FIG. 13, the impellers 134a and 134b may include a first impeller 134a at a side of the purified water inlet pipe 131 and the carbon dioxide inlet pipe 132, and a second impeller 134b at a side of the second mixing pipe 137. The first impeller 134a rotates in the clockwise direction to move purified water and carbon dioxide which flow into, to the mixing region 136. In addition, the second impeller 134b rotates in the counterclockwise direction to move carbonated water which is generated in the mixing region 136 and moves toward the second mixing pipe 137, to the mixing region 136 again.

In addition, although a structure and a material of the impellers 134 may have a type having wings in a direction parallel to an outer circumference based on an outer diameter thereof as illustrated in FIG. 13, they are not limited thereto, and may be used as one example of a structure and a material of the impeller 134 as long as they can move purified water, carbon dioxide, and carbonated water to the mixing region 136 for mixing them.

The mixing partitions 135a and 135b may be provided at an inner circumferential surface of the first mixing pipe 133 to form a flow path which induces flows of purified water, carbon dioxide, and carbonated water, and may generate a vortex to improve mixing efficiency.

Specifically, as illustrated in FIG. 13, the mixing partitions 135a and 135b may be provided on the inner circumferential surface of the first mixing pipe 133 to converge purified water, carbon dioxide, and carbonated water moving through the impellers 134, and to generate a vortex to converge the purified water, the carbon dioxide, and the carbonated water on the mixing region 136.

In addition, the mixing partitions 135a and 135b may include a first mixing partition 135a at a side of the purified water inlet pipe 131 and the carbon dioxide inlet pipe 132 and a second mixing partition 135b at a side of the second mixing pipe 137.

The first mixing partition 135a may be formed to have a slope toward the first mixing pipe 133. The first mixing partition 135a may converge purified water which flows from the purified water inlet pipe 131 and carbon dioxide which flows from the carbon dioxide inlet pipe 132 on the first impeller 134a, and may increase an amount of the purified water, the carbon dioxide and carbonated water which are moved to the mixing region 136 by rotating of the first impeller 134a. In addition, the first impeller 134a may prevent carbonated water generated in the mixing region 136 from moving toward the purified water inlet pipe 131 and the carbon dioxide inlet pipe 132 along the first impeller 134a, and may generate a vortex.

The second mixing partition 135b may be formed to have a slope toward the second mixing pipe 137. The second mixing partition 135b may prevent purified water, carbon dioxide, and carbonated water moved by the first impeller 134a from moving toward the second mixing pipe 137, and may guide the purified water, the carbon dioxide, and the carbonated water to move to the mixing region 136. In addition, the second mixing partition 135b may prevent purified water, carbon dioxide and carbonated water moved by the second impeller 134b from moving toward the purified water inlet pipe 131 and the carbon dioxide inlet pipe 132, and may generate a vortex.

The second mixing pipe 137 may provide a path through which produced carbonated water is delivered toward the unified discharge path 190. In this case, since an inner diameter of the second mixing pipe 137 is less than an inner diameter of the first mixing pipe 133, a moving speed of carbonated water which flows in the second mixing pipe 137 may be increased, a time in which the purified water and the carbon dioxide are mixed in the first mixing pipe 133 may be increased, and thus mixing efficiency may be increased.

Figure 14:
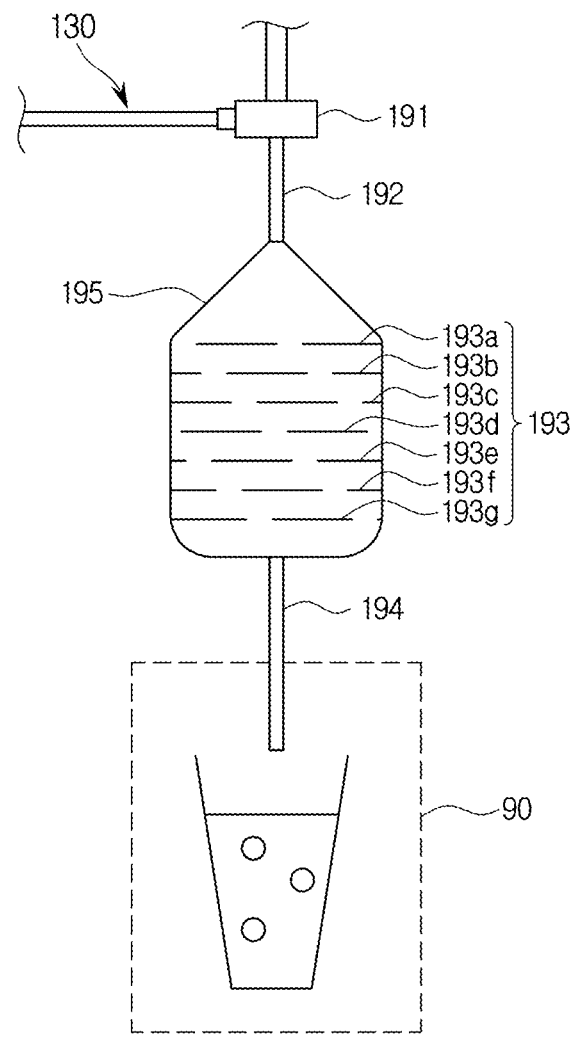
FIG. 14 illustrates a concept in which a carbonated water depressurization module according to one embodiment of the present disclosure decreases a pressure of carbonated water.

FIG. 14 illustrates a concept in which a carbonated water depressurization module decreases a pressure of carbonated water.

When carbonated water which is generated in the mixing pipe 130 is directly discharged to the dispenser module 90 through the unified discharge path 190 without being stored and matured in the carbonated water tank 138, since the carbonated water is produced in a high pressure state, scattering may occur due to the high pressure during discharge of the carbonated water. Accordingly, the unified discharge path 190 may include a depressurization module 195 which decreases a pressure of carbonated water.

The depressurization module 195 may be provided between a unified discharge inlet pipe 192 connected to the carbonated water discharge valve 191 and a unified discharge outlet pipe 194 connected to a dispenser module 90 to decrease a pressure of carbonated water which is discharged. In addition, the depressurization module 195 may include a depressurization net 193 which disturbs a flow of carbonated water and decreases a pressure of the carbonated water.

As illustrated in FIG. 14, the depressurization net 193 may be provided with a plurality of depressurization nets 193_a, 193_b, 193_c, 193_d, 193_e, 193_f, and 193_g such that carbonated water does not pass through, and a flow of the carbonated water is disturbed.

Any structure, material, and the like of the depressurization net 193 may be used as one example as long as it is for decreasing a pressure of carbonated water.

FIG. 15 illustrates a flowchart of a method of producing carbonated water.

First, the controller determines a target pressure of purified water and a target pressure of carbon dioxide based on a target concentration input in the user interface or a basic value of a concentration basically set at the refrigerator (S 10).

In addition, the controller may transmit a control signal to the purified water pump to control such that the purified water pump increases a water pressure of purified water to the target pressure (S 20). In addition, the controller may transmit a control signal to the carbon dioxide regulator to control such that the carbon dioxide regulator decreases an air pressure of carbon dioxide to the target pressure (S 30).

Next, the purified water pump may supply the purified water of which the pressure is increased to the target pressure to the mixing pipe, and the carbon dioxide regulator may supply the carbon dioxide of which the pressure is decreased to the target pressure to the mixing pipe (S 40).

In addition, the controller may open the carbonated water discharge valve which discharges carbonated water to discharge the carbonated water to the dispenser module (S 50).

As is apparent from the above description, the refrigerator and the method of controlling the same according to the embodiment of the present disclosure can increase a pressure of water mixed with carbon dioxide to increase solubility of carbon dioxide in the water and can decrease a production time.

The above description is only an example describing a technological scope of the present disclosure. Various changes, modifications, and replacements may be made without departing from the spirit and scope of the present disclosure by those skilled in the art. Therefore, the embodiments disclosed above and in the accompanying drawings should be considered in a descriptive sense only and not for limiting the technological scope. The technological scope of the present disclosure is not limited by these embodiments and the accompanying drawings. The spirit and scope of the present disclosure should be interpreted by the appended claims and encompass all equivalents falling within the scope of the appended claims.

What is claimed is:

1. A refrigerator comprising:
a purified water pump which increases a pressure of water;
a carbon dioxide regulator which decreases a pressure of carbon dioxide;
a mixing pipe which mixes water introduced from the purified water pump and carbon dioxide introduced from the carbon dioxide regulator, and produces carbonated water;
a user interface which receives a production condition of carbonated water from a user;
a controller which controls the purified water pump and the carbon dioxide regulator such that the pressure of the water and the pressure of the carbon dioxide reach a target pressure corresponding to the input production condition; and
a unified discharge path which discharges the produced carbonated water,
wherein the unified discharge path includes a carbonated water depressurization module which decreases a pressure of the discharged carbonated water.

2. The refrigerator of claim 1, wherein the user interface receives a target concentration of carbonated water from a user, and the controller controls to adjust a supply amount and pressure of the water and the carbon dioxide supplied to the mixing pipe such that a concentration of carbonated water produced in the mixing pipe reaches the input target concentration.

3. The refrigerator of claim 1, wherein the carbon dioxide regulator includes a carbon dioxide supply motor and a rotation sensor which senses a rotation displacement of the carbon dioxide supply motor using at least one of an optical sensor and a hall sensor.

4. The refrigerator of claim 1, wherein the mixing pipe includes a purified water inlet pipe through which the water flows in, a carbon dioxide inlet pipe through which the carbon dioxide flows in, a first mixing pipe which is connected to the purified water inlet pipe and the carbon dioxide inlet pipe, mixes the water and the carbon dioxide, and produces carbonated water, and a second mixing pipe which is connected to the first mixing pipe, and discharges the produced carbonated water.

5. The refrigerator of claim 4, wherein an inner diameter of the first mixing pipe is greater than that of the second mixing pipe.

6. The refrigerator of claim 4, wherein the mixing pipe further includes an impeller which is positioned in the first mixing pipe and rotates to mix the water and the carbon dioxide.

7. The refrigerator of claim 4, wherein the mixing pipe further includes a mixing partition which provides a flow path configured to prevent flow of the water and the carbon dioxide in the first mixing pipe, and generates a vortex.

8. The refrigerator of claim 1, further comprising a carbonated water tank which is provided at a discharge hole of the mixing pipe, stores produced carbonated water, and matures the carbonated water to adjust a size of bubble thereof.

9. The refrigerator of claim 8, wherein the carbonated water tank includes a water level sensor which senses a water level of carbonated water, and when the sensed water level of the carbonated water is equal to or less than a preset water level, the controller controls the purified water pump and the carbon dioxide regulator to produce carbonated water until the water level of the carbonated water is greater than the preset water level.

10. A refrigerator comprising:
a purified water pump which increases a pressure of water;
a carbon dioxide regulator which decreases a pressure of carbon dioxide;
a mixing pipe which mixes water introduced from the purified water pump, and carbon dioxide introduced from the carbon dioxide regulator, and produces carbonated water;
a controller which determines a target pressure of the water and the carbon dioxide, and controls the purified water pump and the carbon dioxide regulator such that the pressure of the water and the pressure of the carbon dioxide reaches the target pressure; and
a unified discharge path which discharges the produced carbonated water,
wherein the unified discharge path includes a carbonated water depressurization module which decreases a pressure of the discharged carbonated water.

11. A method of controlling a refrigerator, comprising:
receiving a production condition of carbonated water from a user;
increasing a pressure of water to a target pressure corresponding to the input production condition using a purified water pump;
decreasing a pressure of carbon dioxide to the target pressure using a carbon dioxide regulator;
simultaneously mixing the water having the target pressure and the carbon dioxide having the target pressure using a mixing pipe, and producing carbonated water; and
decreasing a pressure of carbonated water discharged to a unified discharge path.

12. The method of claim 11, further comprising:
receiving a target concentration of carbonated water from a user; and
adjusting a supply amount and a pressure of each of the water and the carbon dioxide supplied to the mixing pipe such that a concentration of carbonated water produced in the mixing pipe reaches the received target concentration.

13. The method of claim 11, wherein the decreasing of the pressure of the carbon dioxide includes adjusting a rotation displacement of a carbon dioxide supply motor included in the carbon dioxide regulator using at least any one of an optical sensor and a hall sensor to decrease the pressure of the carbon dioxide.

14. The method of claim 11, wherein the producing of the carbonated water includes introducing the water into a purified water inlet pipe, introducing the carbon dioxide into a carbon dioxide inlet pipe, mixing the introduced water and the introduced carbon dioxide and producing carbonated water in a first mixing pipe, and discharging the produced carbonated water to a second mixing pipe.

15. The method of claim 14, wherein the mixing of the introduced water and the introduced carbon dioxide includes rotating an impeller positioned in the first mixing pipe to mix the introduced water and the introduced carbon dioxide.

16. The method of claim 14, wherein the mixing of the introduced water and the introduced carbon dioxide includes providing a flow path in which a mixing partition positioned in the first mixing pipe disturbs flow of the water and the carbon dioxide, and generating a vortex to mix the introduced water and the introduced carbon dioxide.

17. The method of claim 11, further comprising storing and maturing produced carbonated water in a carbonated water tank provided at a discharge hole of the mixing pipe, and adjusting a size of bubble of the carbonated water.

18. The method of claim 17, further comprising sensing a water level of carbonated water stored in the carbonated water tank; and
  when the sensed water level of the carbonated water is equal to or less than a preset water level, producing carbonated water until the water level of the carbonated water is greater than the preset water level.

\* \* \* \* \*